(12) United States Patent
Jenkins et al.

(10) Patent No.: US 10,261,938 B1
(45) Date of Patent: Apr. 16, 2019

(54) CONTENT PRELOADING USING PREDICTIVE MODELS

(75) Inventors: Jonathan A. Jenkins, Seattle, WA (US); Nathan Alan Dye, Seattle, WA (US); Bradley E. Marshall, Bainbridge Island, WA (US); Brett R. Taylor, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 461 days.

(21) Appl. No.: 13/601,563

(22) Filed: Aug. 31, 2012

(51) Int. Cl.
*G06F 15/167* (2006.01)

(52) U.S. Cl.
CPC .................................. *G06F 15/167* (2013.01)

(58) Field of Classification Search
CPC ............. H04L 67/6842; H04L 67/6847; G06F 17/30902
USPC ......................................................... 709/213
See application file for complete search history.

(56) References Cited

U.S. PATENT DOCUMENTS

| 5,802,292 | A | * | 9/1998 | Mogul .............. G06F 17/30902 707/E17.12 |
|---|---|---|---|---|
| 5,931,907 | A | | 8/1999 | Davies et al. |
| 5,933,811 | A | | 8/1999 | Angles et al. |
| 6,009,410 | A | | 12/1999 | Lemole et al. |
| 6,134,244 | A | | 10/2000 | Van Renesse et al. |
| 6,185,558 | B1 | | 2/2001 | Bowman et al. |
| 6,233,571 | B1 | | 5/2001 | Egger et al. |
| 6,233,575 | B1 | | 5/2001 | Agrawal et al. |
| 6,260,061 | B1 | * | 7/2001 | Krishnan .......... G06F 17/30902 707/E17.12 |
| 6,266,649 | B1 | | 7/2001 | Linden et al. |
| 6,282,534 | B1 | | 8/2001 | Vora |
| 6,338,066 | B1 | | 1/2002 | Martin et al. |
| 6,361,326 | B1 | | 3/2002 | Fontana et al. |
| 6,385,641 | B1 | * | 5/2002 | Jiang ....................... H04L 29/06 709/203 |
| 6,411,967 | B1 | | 6/2002 | Van Renesse |
| 6,421,675 | B1 | | 7/2002 | Ryan et al. |
| 6,438,579 | B1 | | 8/2002 | Hosken |

(Continued)

FOREIGN PATENT DOCUMENTS

WO          01/25947          4/2001

OTHER PUBLICATIONS

U.S. Appl. No. 11/479,225, filed Jun. 30, 2006, Christoph L. Scofield, et al.

(Continued)

*Primary Examiner* — Blake J Rubin
(74) *Attorney, Agent, or Firm* — Robert C. Kowert; Meyertons, Hood, Kivlin, Kowert & Goetzel, P.C.

(57) ABSTRACT

Methods and apparatus for content preloading using predictive models are disclosed. A system includes computing devices that generate a model to determine a predicted set of additional network content assets anticipated to be requested by a client after the client has requested a given set of assets. The devices determine, based on characteristics of a client's content request, whether to initiate an asset preload operation using the model. If a decision is made to initiate an asset preload, the devices identify, using the model, the predicted set of assets corresponding to the request, and initiate delivery of at least a portion of the predicted set to one or more destinations on behalf of the client.

28 Claims, 9 Drawing Sheets

(56) References Cited

U.S. PATENT DOCUMENTS

| | | | |
|---|---|---|---|
| 6,460,036 B1* | 10/2002 | Herz | G06F 17/30867 |
| | | | 348/E7.056 |
| 6,493,702 B1 | 12/2002 | Adar et al. | |
| 6,493,703 B1 | 12/2002 | Knight et al. | |
| 6,529,953 B1 | 3/2003 | Van Renesse | |
| 6,542,964 B1* | 4/2003 | Scharber | 711/122 |
| 6,549,896 B1* | 4/2003 | Candan et al. | |
| 6,564,210 B1 | 5/2003 | Korda et al. | |
| 6,584,504 B1 | 6/2003 | Choe | |
| 6,604,103 B1* | 8/2003 | Wolfe | G06F 17/30306 |
| 6,721,744 B1 | 4/2004 | Naimark et al. | |
| 6,724,770 B1 | 4/2004 | Van Renesse | |
| 6,738,678 B1 | 5/2004 | Bharat et al. | |
| 6,742,033 B1* | 5/2004 | Smith | G06F 17/30902 |
| | | | 707/E17.12 |
| 6,757,682 B1 | 6/2004 | Naimark et al. | |
| 6,842,737 B1 | 1/2005 | Stiles et al. | |
| 6,850,577 B2 | 2/2005 | Li | |
| 6,871,202 B2 | 3/2005 | Broder | |
| 6,912,505 B2 | 6/2005 | Linden et al. | |
| 6,920,505 B2 | 7/2005 | Hals et al. | |
| 6,981,040 B1* | 12/2005 | Konig | G06F 17/30867 |
| | | | 707/E17.109 |
| 6,993,591 B1* | 1/2006 | Klemm | H04L 67/2847 |
| | | | 707/999.002 |
| 7,010,762 B2 | 3/2006 | O'Neil | |
| 7,039,677 B2 | 5/2006 | Fitzpatrick et al. | |
| 7,181,447 B2 | 2/2007 | Curtis et al. | |
| 7,216,290 B2 | 5/2007 | Goldstein et al. | |
| 7,278,092 B2 | 10/2007 | Krzanowski | |
| 7,296,051 B1 | 11/2007 | Lasriel | |
| 7,333,431 B2 | 2/2008 | Wen et al. | |
| 7,360,166 B1 | 4/2008 | Krzanowski | |
| 7,392,262 B1 | 6/2008 | Alspector et al. | |
| 7,440,976 B2 | 10/2008 | Hart et al. | |
| 7,467,349 B1 | 12/2008 | Bryar et al. | |
| 7,519,990 B1 | 4/2009 | Xie | |
| 7,552,365 B1 | 6/2009 | Marsh et al. | |
| 7,565,425 B2 | 7/2009 | Van Vleet et al. | |
| 7,590,562 B2 | 9/2009 | Stoppelman | |
| 7,594,189 B1 | 9/2009 | Walker et al. | |
| 7,649,838 B2 | 1/2010 | Fishteyn et al. | |
| 7,660,815 B1 | 2/2010 | Scofield et al. | |
| 7,685,192 B1 | 3/2010 | Scofield et al. | |
| 7,716,425 B1* | 5/2010 | Uysal | G06F 12/0862 |
| | | | 711/137 |
| 7,774,335 B1 | 8/2010 | Scofield et al. | |
| 7,797,421 B1 | 9/2010 | Scofield et al. | |
| 7,831,582 B1 | 11/2010 | Scofield et al. | |
| 7,860,895 B1 | 12/2010 | Scofield et al. | |
| 7,966,395 B1 | 6/2011 | Pope et al. | |
| 8,131,665 B1* | 3/2012 | Wolfe | G06F 17/30306 |
| | | | 707/602 |
| 8,136,089 B2* | 3/2012 | Snodgrass | G06F 17/30893 |
| | | | 707/721 |
| 8,140,646 B2* | 3/2012 | Mickens | G06F 17/30902 |
| | | | 709/203 |
| 8,225,195 B1 | 7/2012 | Bryar et al. | |
| 8,229,864 B1* | 7/2012 | Lin | G06F 17/246 |
| | | | 706/11 |
| 8,521,664 B1* | 8/2013 | Lin | G06N 99/005 |
| | | | 706/12 |
| 8,583,763 B1* | 11/2013 | Kim | G06F 21/53 |
| | | | 709/218 |
| 8,626,791 B1* | 1/2014 | Lin | G06F 17/30902 |
| | | | 706/12 |
| 8,645,494 B1* | 2/2014 | Altman | H04L 67/02 |
| | | | 709/203 |
| 8,867,807 B1* | 10/2014 | Fram | G06F 19/321 |
| | | | 382/128 |
| 8,984,048 B1* | 3/2015 | Maniscalco | G06F 17/30902 |
| | | | 709/201 |
| 9,037,638 B1* | 5/2015 | Lepeska | H04L 67/2847 |
| | | | 709/203 |
| 9,106,607 B1* | 8/2015 | Lepeska | H04L 67/2847 |
| 9,436,763 B1* | 9/2016 | Gianos | G06F 17/30864 |
| 2001/0037401 A1 | 11/2001 | Soumiya et al. | |
| 2001/0053129 A1 | 12/2001 | Arsikere et al. | |
| 2002/0055872 A1 | 5/2002 | Labrie et al. | |
| 2002/0065933 A1 | 5/2002 | Kobayashi | |
| 2002/0078230 A1 | 6/2002 | Hals et al. | |
| 2002/0083067 A1 | 6/2002 | Tamayo et al. | |
| 2002/0124075 A1 | 9/2002 | Venkatesan | |
| 2002/0147788 A1 | 10/2002 | Nguyen | |
| 2002/0174101 A1 | 11/2002 | Fernley et al. | |
| 2002/0178259 A1 | 11/2002 | Doyle et al. | |
| 2002/0178381 A1 | 11/2002 | Lee et al. | |
| 2003/0028890 A1 | 2/2003 | Swart et al. | |
| 2003/0040850 A1 | 2/2003 | Najmi et al. | |
| 2003/0074409 A1 | 4/2003 | Bentley | |
| 2003/0088580 A1* | 5/2003 | Desai | G06F 17/30902 |
| 2003/0115281 A1* | 6/2003 | McHenry et al. | 709/213 |
| 2003/0115289 A1 | 6/2003 | Chinn et al. | |
| 2003/0121047 A1 | 6/2003 | Watson et al. | |
| 2003/0187984 A1* | 10/2003 | Banavar | H04L 29/06 |
| | | | 709/225 |
| 2003/0193893 A1 | 10/2003 | Wen et al. | |
| 2003/0212760 A1 | 11/2003 | Chen et al. | |
| 2004/0031058 A1 | 2/2004 | Reisman | |
| 2004/0073533 A1 | 4/2004 | Mynarski et al. | |
| 2004/0093414 A1 | 5/2004 | Orton | |
| 2004/0098486 A1* | 5/2004 | Gu | G06F 17/30902 |
| | | | 709/228 |
| 2004/0111508 A1 | 6/2004 | Dias et al. | |
| 2004/0193706 A1 | 9/2004 | Willoughby et al. | |
| 2004/0236736 A1 | 11/2004 | Whitman et al. | |
| 2004/0255027 A1 | 12/2004 | Vass et al. | |
| 2005/0013244 A1* | 1/2005 | Parlos | H04L 41/5009 |
| | | | 370/229 |
| 2005/0015626 A1 | 1/2005 | Chasin | |
| 2005/0033803 A1 | 2/2005 | Vleet et al. | |
| 2005/0044101 A1 | 2/2005 | Prasad et al. | |
| 2005/0071221 A1 | 3/2005 | Selby | |
| 2005/0071328 A1 | 3/2005 | Lawrence | |
| 2005/0131992 A1 | 6/2005 | Goldstein et al. | |
| 2005/0138143 A1* | 6/2005 | Thompson | G06F 17/30902 |
| | | | 709/218 |
| 2005/0154701 A1 | 7/2005 | Parunak et al. | |
| 2005/0182755 A1 | 8/2005 | Tran | |
| 2005/0182849 A1 | 8/2005 | Chandrayana et al. | |
| 2005/0210008 A1 | 9/2005 | Tran et al. | |
| 2005/0234893 A1 | 10/2005 | Hirsch | |
| 2005/0246651 A1 | 11/2005 | Krzanowski | |
| 2005/0256866 A1 | 11/2005 | Lu et al. | |
| 2005/0267869 A1* | 12/2005 | Horvitz | G06F 17/30867 |
| 2005/0289140 A1 | 12/2005 | Ford et al. | |
| 2006/0004703 A1 | 1/2006 | Spivack et al. | |
| 2006/0026153 A1 | 2/2006 | Soogoor | |
| 2006/0059163 A1 | 3/2006 | Frattura et al. | |
| 2006/0069742 A1* | 3/2006 | Segre | 709/217 |
| 2006/0080321 A1 | 4/2006 | Horn et al. | |
| 2006/0085447 A1 | 4/2006 | D'urso | |
| 2006/0095331 A1 | 5/2006 | O'malley et al. | |
| 2006/0101514 A1 | 5/2006 | Milener et al. | |
| 2006/0123338 A1 | 6/2006 | Mccaffrey et al. | |
| 2006/0129916 A1 | 6/2006 | Volk et al. | |
| 2006/0161520 A1 | 7/2006 | Brewer et al. | |
| 2006/0165009 A1 | 7/2006 | Nguyen et al. | |
| 2006/0176828 A1 | 8/2006 | Vasseur et al. | |
| 2006/0184500 A1 | 8/2006 | Najork et al. | |
| 2006/0190852 A1 | 8/2006 | Sotiriou | |
| 2006/0193332 A1 | 8/2006 | Qian et al. | |
| 2006/0200443 A1 | 9/2006 | Kahn et al. | |
| 2006/0200445 A1 | 9/2006 | Chen et al. | |
| 2006/0206428 A1 | 9/2006 | Vidos et al. | |
| 2006/0206799 A1 | 9/2006 | Vidos et al. | |
| 2006/0206803 A1 | 9/2006 | Smith | |
| 2006/0242145 A1 | 10/2006 | Krishnamurthy et al. | |
| 2006/0248059 A1* | 11/2006 | Chi | G06F 17/30867 |
| 2006/0259462 A1 | 11/2006 | Timmons | |
| 2006/0265508 A1 | 11/2006 | Angel et al. | |

(56) References Cited

U.S. PATENT DOCUMENTS

| | | |
|---|---|---|
| 2006/0288072 A1 | 12/2006 | Knapp et al. |
| 2006/0294124 A1 | 12/2006 | Cho |
| 2006/0294223 A1* | 12/2006 | Glasgow .............. H04L 67/2847 709/224 |
| 2007/0027830 A1 | 2/2007 | Simons et al. |
| 2007/0033104 A1 | 2/2007 | Collins et al. |
| 2007/0050387 A1 | 3/2007 | Busey |
| 2007/0055477 A1* | 3/2007 | Chickering ........ G06K 9/00503 702/182 |
| 2007/0067682 A1 | 3/2007 | Fang |
| 2007/0088955 A1 | 4/2007 | Lee et al. |
| 2007/0106751 A1 | 5/2007 | Moore |
| 2007/0112639 A1 | 5/2007 | Blumenau |
| 2007/0136696 A1 | 6/2007 | Matthews |
| 2007/0156761 A1 | 7/2007 | Smith, III |
| 2007/0156845 A1* | 7/2007 | Devanneaux ..... G06F 17/30902 709/217 |
| 2007/0180510 A1 | 8/2007 | Long et al. |
| 2007/0192485 A1 | 8/2007 | Mcmahan et al. |
| 2007/0244900 A1 | 10/2007 | Hopkins et al. |
| 2007/0255844 A1* | 11/2007 | Shen ...................... H04L 12/00 709/231 |
| 2008/0005273 A1 | 1/2008 | Agarwalla et al. |
| 2008/0040314 A1 | 2/2008 | Brave et al. |
| 2008/0065718 A1* | 3/2008 | Todd et al. .................... 709/203 |
| 2008/0133510 A1 | 6/2008 | Timmons |
| 2008/0141307 A1 | 6/2008 | Whitehead |
| 2008/0147971 A1* | 6/2008 | Hawkins ................ A63F 13/00 711/113 |
| 2008/0201331 A1* | 8/2008 | Eriksen ............ G06F 17/30902 |
| 2008/0306959 A1 | 12/2008 | Spivack et al. |
| 2009/0028441 A1 | 1/2009 | Milo et al. |
| 2009/0063652 A1* | 3/2009 | Hwang et al. ................ 709/213 |
| 2009/0172773 A1 | 7/2009 | Moore |
| 2009/0254971 A1 | 10/2009 | Herz et al. |
| 2010/0049678 A1* | 2/2010 | Huang .............. G06F 17/30902 706/14 |
| 2010/0115388 A1 | 5/2010 | Nguyen |
| 2010/0174775 A1* | 7/2010 | Saiki ........................ H04L 67/06 709/203 |
| 2010/0180082 A1* | 7/2010 | Sebastian et al. ............ 711/126 |
| 2010/0281224 A1* | 11/2010 | Ho .................... G06F 17/30902 711/137 |
| 2010/0287191 A1 | 11/2010 | Price et al. |
| 2010/0332513 A1* | 12/2010 | Azar ................. G06F 17/30469 707/769 |
| 2011/0029641 A1* | 2/2011 | Fainberg ........... G06F 17/30902 709/219 |
| 2011/0029899 A1* | 2/2011 | Fainberg ........... G06F 17/30902 715/760 |
| 2011/0040777 A1 | 2/2011 | Stefanov |
| 2011/0087842 A1* | 4/2011 | Lu et al. ........................ 711/126 |
| 2011/0131341 A1* | 6/2011 | Yoo .................... G06F 17/30902 709/237 |
| 2011/0167054 A1* | 7/2011 | Bailey ............... G06F 17/30864 707/710 |
| 2011/0173569 A1* | 7/2011 | Howes ............... G06F 17/30902 715/835 |
| 2011/0196853 A1* | 8/2011 | Bigham .................... G06F 8/35 707/706 |
| 2011/0246406 A1* | 10/2011 | Lahav ..................... G06Q 30/02 706/46 |
| 2011/0296048 A1* | 12/2011 | Knox et al. .................... 709/231 |
| 2012/0047445 A1* | 2/2012 | Rajagopal ......... G06F 17/30902 715/747 |
| 2012/0084343 A1* | 4/2012 | Mir .................... H04L 29/12066 709/203 |
| 2012/0096106 A1* | 4/2012 | Blumofe et al. ............... 709/213 |
| 2012/0143844 A1* | 6/2012 | Wang ................ G06F 17/30864 707/709 |
| 2012/0209942 A1* | 8/2012 | Zehavi .............. H04L 29/08729 709/213 |
| 2012/0233069 A1* | 9/2012 | Bulawa .................... G06Q 20/10 705/40 |
| 2012/0239598 A1* | 9/2012 | Cascaval ........... G06F 17/30899 706/12 |
| 2012/0246257 A1* | 9/2012 | Brown .............. G06F 17/30902 709/213 |
| 2012/0278476 A1* | 11/2012 | Agrawal ................ G06Q 50/01 709/224 |
| 2012/0284597 A1* | 11/2012 | Burkard ............ G06F 17/30902 715/205 |
| 2012/0323838 A1* | 12/2012 | Ulinski ............. G06F 17/30902 706/52 |
| 2013/0019159 A1* | 1/2013 | Civelli ............. G06F 17/30902 715/234 |
| 2013/0041881 A1* | 2/2013 | Wierman .......... G06F 17/30864 707/709 |
| 2013/0151652 A1* | 6/2013 | Brech ................ G06F 17/30902 709/216 |
| 2013/0226837 A1* | 8/2013 | Lymberopoulos .......................... G06F 17/30902 706/12 |
| 2014/0019577 A1* | 1/2014 | Lobo ................... H04L 67/2842 709/213 |
| 2014/0365861 A1* | 12/2014 | Lasmarias ................. G06F 9/54 715/234 |
| 2014/0373032 A1* | 12/2014 | Merry ....................... G06F 9/54 719/328 |
| 2015/0229733 A1* | 8/2015 | Yang ................. G06F 17/30864 709/213 |

OTHER PUBLICATIONS

U.S. Appl. No. 11/238,070, filed Sep. 28, 2005, Elmore Eugene Pop, et al.
3bubbles.com, Frequently Asked Questions, http://web.archive.org/web/20060626213746/3bubbles.com/faq.php, 2006, 3 pages.
U.S. Appl. No. 10/864,288, filed Jun. 9, 2004, Dennis Lee, et al.
Junghoo Cho, Page Quality: In Search of an Unbiased Web Ranking, Jun. 14, 2005, SIGMOD, p. 1-13.
Salton, "Search and retrieval experiments in real-time information retrieval," Cornell University Technical Report No. 68-8, 1968, 34 pages.
Amazon.com, "What are statistically improbable phrases?," http://web.archive.org/web/20050416181614/http://www.amazon.com/gp/search-inside/sipshelp.heml, 2005, 1 page.
Salton, et al., "Term weighting approaches in automatic text retrieval," Information Processing and Management, v.24, No. 5, 1988, 11 pages.
Rocchio, "Relevance Feedback in Information Retrieval," in Salton, ed., "The Smart System—experiments in automatic document processing," pp. 313-323, 1971, 13 pages.
Forney, "The Viterby algoritm," Proceedings of the IEEE, v. 61, No. 3, 1973, 11 pages.
BlogPulse FAQs, www.blogpulse.com/about.html, 2005, 8 pages.
Brin, et al., "Anatomy of a large-scale hypertextual web search engine," Proceedings of the 7th International World Wide Web Conference, 1998, 20 pages.
MyBlogLog FAQs, http://web.archive.org/web/20050307012413/www.mybloglog.com/help/, 2005, 2 pages.
Net Applications, "Are all web site statistics reports created equal?", Feb. 2005, 3 pages.
Net Applications, "How to maximize the ROI from your web site," Feb. 2005, 4 pages.
IMNMotion Behavior Monitor, www.whitefrost.com/projects/mousetrax, 2003, 2 pages.
Touchgraph Amazon Browser V1.01, http://web.archive.org/web/20050104085346/www.touchgraph.com/TGAmazonBrowser.html, 2005, 2 pages.
Jeanson, et al., "Pheromone trail decay rates on different substrates in the Pharaoh's ant, *Monomorium pharaonis*," Physiological Entomology v. 28, 2003, 7 pages.
Martin, et al., "The privacy practices of web browser extensions," Privacy Foundation, Dec. 6, 2000, 61 pages.

(56) References Cited

OTHER PUBLICATIONS

Menkov, et al., "AntWorld: A collaborative web search tool," Proceedings of Distributed Communities on the Web, Third International Workshop, 2000, 10 pages.
Kantor, et al., "The information question: A dynamic model of user's information needs," Proceedings of the 62nd Annual Meeting of the American Society for Information Science, 1999, 10 pages.
Dorigo, et al., "The ant system: Optimization by a colony of cooperating agents," IEEE Transactions on Systems, Man, and Cybernetics, Part B, vol. 26, No. 1, 1996, 26 pages.
Mute: how ants find food, http://web.archive.org/web/20041209082357/mute-net.sourceforge.net/howAnts.shtml, 2004, 9 pages.
Levy, "In the new game of tag, all of us are it," Newsweek, Apr. 18, 2005, 2 pages.
Harth, et al., "Collaborative filtering in a distributed environment: an agent-based approach," Technical report, University of Applied Sciences Wurzburg, Germany, Jun. 2001, 7 pages.
Shapira, et al., "The effect of extrinsic motivation on user behavior in a collaborative information finding system," Journal of the American Society of Information Science and Technology, 2001, 27 pages.
Panait, et al., "A pheromone-based utility model for collaborative foraging," Proceedings of the 2004 International Conference on Autonomous Agents and Multiagent Systems, 8 pages.
Theraulaz, et al., "The formation of spatial patterns in social insects: from simple behaviors to complex structures," Philosophical Transactions of the Royal Society of London A, 2003, 20 pages.
Andersson, et al., "Admission control of the Apache web server," Proceedings of Nordic Teletraffic Seminar 2004, 12 pages.
Andersson, et al., "Modeling and design of admission control mechanisms for web servers using non-linear control theory," Proceedings of ITCOM 2003, 12 pages.
Visitorville, "How it works (in a nutshell)," 2005, 3 pages.
Alexa Web Search, "About the Alexa traffic rankings," http://web.archive.org/web/20050527223452/pages.alexa.com/prod_serv/traffic_learn_more.html, 2005, 3 pages.
Alexa Company Info—History, http://web/archive.org/web/20060830003300/www.alexa.com/site/company/history, 2005, 2 pages.
Alexa Company Info—Technology, http://web.archive.org/web/20060830034439/www.alexa.com/site/company/technology, 2005, 2 pages.
Alexa Web Information Service, http://web.archive.org/web/20041231034354/http://pages.alexa.com/prod_serv/WebInfoService.html, 2004, 2 pages.
Vara, "New Search Engines Help Users Find Blogs," Wall Street Journal Online, Sep. 7, 2005.
Dowdell, "BlogPulse New & Improved Blog Search Engine," Marketing Shift blog, http://www.marketingshift.com/2005/7/blogpulse-new-improved-blog-search.cfm, Jul. 20, 2005, 55 pages.
Technorati Tour, "How Technorati Works," http://web.archive.org/web/20050702025310/http://www.technorati.com/tour/page2.html, 2005, 1 page.
Technorati, "About Us," http://web.archive.org/web/20050703012613/www.technorati.com/about/, 2005, 1 page.
Fry, About Anemone: http://web.archive.org/.web.20041209174809/http://acg.media.mit.edu/people/fry/anemone/about/, 2004, 4 pages.
Fry, "Organic Information Design," Master's Thesis, Massachusetts Institute of Technology, http://acg.media.mit.edu/people/fry/thesis/thesis-0522d.pdf, May 2000, 97 pages.
O'Reilly Radar—About, http://web.archive.org/web/20050421173629/radar.oreilly.com/about/, 2005, 3 pages.
del.icio.us—About, http://del.icio.us/about/, 2008, 2 pages.
About Stumbleupon, http://web.archive.org/web/20050107011918/www.stupmbleupon.com/about.html, 2004, 2 pages.
Van Renesse, et al., "Astrolabe: A robust and scalable technology for distributed system monitoring, management, and data mining," ACM Transactions on Computer Systems, May 2003, 43 pages.
Erinaki, et al., "SEWeP: Using site semantics and a taxonomy to enhance the web personalization process," Proceedings of the Ninth ACM SIGKDD International Conference on Knowledge Discovery and Data Mining, Aug. 2003, 10 pages.
Wilson, "Pheromones," Scientific American v. 208, 1963.

* cited by examiner

Notify content providers to include request for "magic.js" as a preload indicator in web pages (e.g., towards the end of any given web page that is to trigger preload, so as to minimize interference with loading of page's other components) 801
Example text to be included in web page:

<script type="text/javascript" src="magic.js"></script>

↓

Receive request for magic.js at delivery server (e.g., web server) 804

↓

Determine, using model, list of assets to be preloaded 807

↓

Dynamically generate a "magic.js" file that results in those assets being requested by client browser 810

Example of dynamically generated magic.js contents:

```
<script language = "JavaScript">
function preloader()
{
        heavyImage = new Image();
        heavyImage.src = "heavyimagefile.jpg";
}
preloader();
</script>
```

↓

Provide results of magic.js execution (i.e., predicted assets) to client browser 813

FIG. 8

CONTENT PRELOADING USING PREDICTIVE MODELS

BACKGROUND

Many companies and other organizations operate large web sites that are used by their customers, as well as the organizations' employees, to obtain access to various types of information and services. Often, clients access the sites from locations that are geographically distributed around the world. As the sophistication and complexity of the content that is made available through the web sites increases, the number of different static and dynamically-generated components of individual web pages can also increase—for example, an HTTP (HyperText Transfer Protocol) request for a single URL (Universal Record Locator) may in some cases result in the transmission to the requester of several different image files of various kinds, numerous static text components, dynamically-generated results of several queries to a backend application server or database, and, in some cases, even content components retrieved dynamically from different third-party sources. Often the content provided is customized in some ways based on the preferences or profiles of the requester.

In at least some cases, the web sites are the primary interface through which the organizations market and sell their products—e.g., an online retailer may sell hundreds or thousands of products via its web sites. Especially in such scenarios, the perceived performance of the web site—e.g., how long it appears to take to navigate from one web page to another, or to retrieve search results, and so on—may be critical to the organization's financial success, as potential customers that are dissatisfied with the web site's responsiveness may take their business elsewhere.

With the increasing popularity in recent years of new web-enabled devices, such as smart phones and tablets, the problem of providing content fast enough to retain client interest and loyalty has become even more complicated, as the different devices (and the versions of web browsers installed on the devices) and the various types of network connections being used (e.g., over cellular links, public or home-based "wi-fi" links, or high-bandwidth corporate network links) may all have very different performance capabilities. Although a number of approaches to speed up perceived and actual web page delivery have been implemented, such as caching of web content at edge servers that are located geographically close to the requesting clients, asynchronous delivery of various types of web page components, and the like, slow responses to web requests remain a potential problem that can have a significant negative impact on an organization's business success.

BRIEF DESCRIPTION OF DRAWINGS

FIG. 8 is a flow diagram illustrating aspects of the operation of a preloader configured to dynamically generate contents of a script that, when executed by a client browser, results in the delivery to the client of a network content asset identified by a predictive model, according to at least one embodiment.

Figure 1:
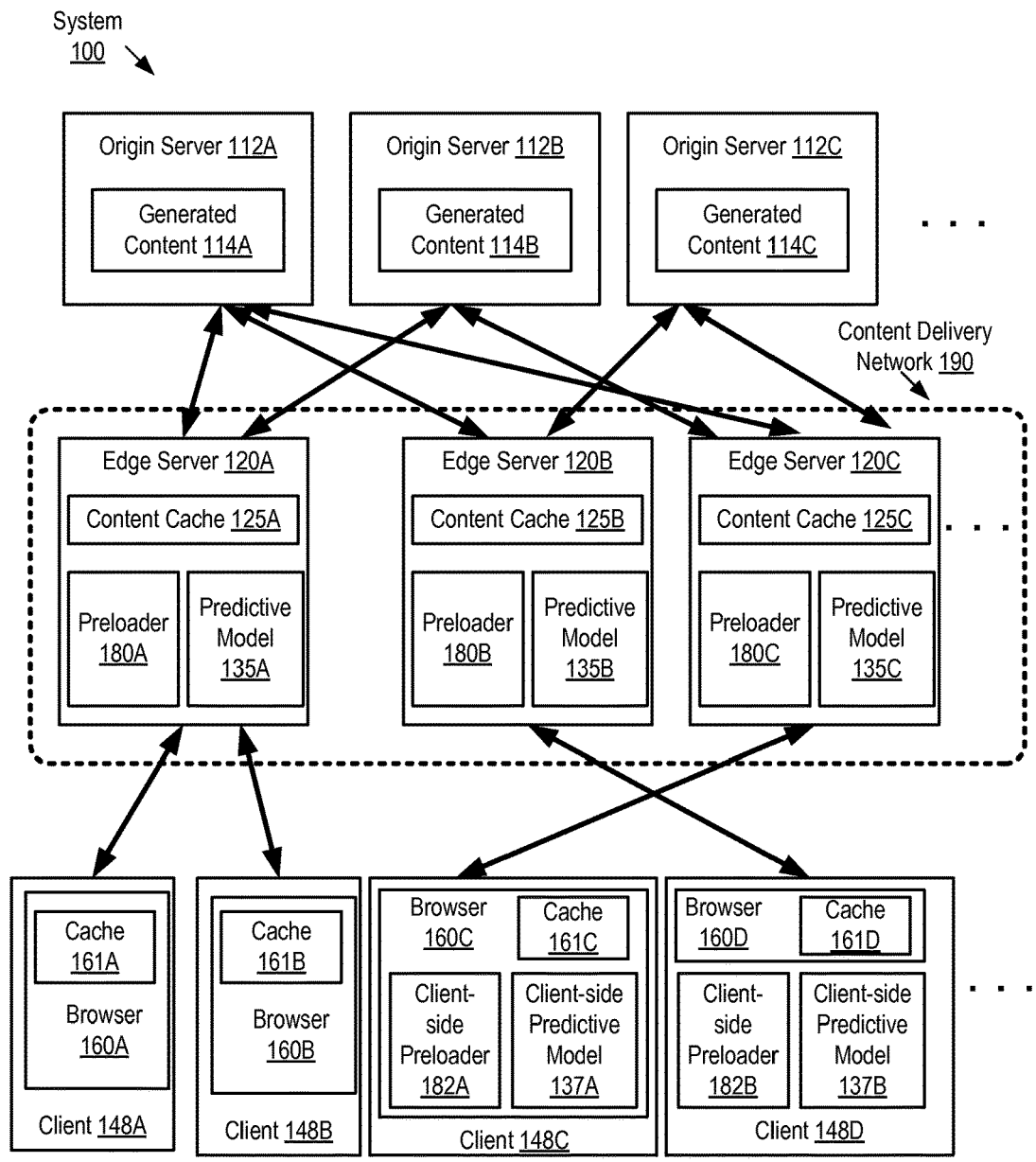
FIG. 1 illustrates an example system environment comprising various nodes of a content delivery network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for content preloading using predictive models are described. Content such as text, images, video, audio, and the like that clients can access from various sources (such as web sites) over network connections may be referred to generally as "network content" or "web content" herein. Individual content components, such as a snippet of text, an image (e.g., a gif file or a jpg file), or browser-executable code elements written in a scripting language, may be termed "assets", "network content assets" or "web content assets". Network content provided to a client as a logical unit, e.g., in response to a single request for a particular URL or web page, may thus comprise one or more assets, some of which may be static (e.g., an unchanging corporate logo image may be included in a large number of the web pages of the corresponding corporation's web sites), while others may be dynamically generated (e.g., a list of products that is customized for a particular client, where the products are identified and sorted dynamically based on the client's preferences, previous request history, and/or the current prices of the products). Sophisticated web sites, such as an online retailer's site or sites, may include hundreds or thousands of web pages potentially reachable from one or more starting points (such as a site "home" page) via large numbers of feasible navigation and/or search paths.

A network content provider, such as an organization that sets up and maintains the web site, may be able to gather various types of information about the incoming client requests and the responses to those requests. Such information may include, for example, the times at which network content requests are received (e.g., at a web server, as indicated in the web server's request logs), the assets transmitted to the clients in response to the requests, as well as various client device or client software properties. For example, in embodiments where the HTTP protocol is in use, each client request may include various HTTP headers, such as a "Referer" header which indicates the address of the previous web page from which a link to the currently requested page was followed. (The word "referrer" was misspelled as "referer" in an early HTTP standards document, Request for Comments (RFC) 1945, and the incorrect spelling has been in general use in HTTP-related discussions and HTTP official documentation since then.) For example, a request for an html page http://www.website1.com/page10.html may include a Referer header "Referer: http://www.website1.com/main.html indicating that "page10.html" was requested via a link on "main.html". Another HTTP header may include a cookie that can be used to identify the requesting client's previous activity, an email address of the client making the request, or a "user-agent" that identifies the client's browser. In additional, the originating network address (e.g., an Internet Protocol or IP address) from which the client sends the request may be tracked as part of establishing the network connection over which the content is transmitted in some embodiments. Other information about the client environment may be available, either directly (e.g., from headers) or indirectly—for example, if a browser version in use at a requesting client's cell-phone device is identified, it may be possible to determine, from some public source, the maximum size of that browser's cache.

Using some combination of these types of information (e.g., request time, response contents, header contents, requester IP address and so on), in some embodiments a predictive model may be generated to identify, given a particular request for some set of content assets from a client, one or more additional assets that the client is likely to request. For example, an analysis of request timing sequences may indicate that when a particular user issues requests within a few seconds for web page A followed by web page B, that user often requests web page C within the next few seconds or minutes. Similar predictions may also be possible from an analysis of HTTP request header information (e.g., Referer headers), which may indicate the path taken (i.e., the links clicked on) to reach a given content page. In some embodiments one or more preloader components of a content delivery system may be responsible for using predictions made by the model to proactively initiate delivery of content assets on behalf of clients. Continuing the discussion of the above example, where requests for pages A and B are found to frequently be followed by requests for page C, page C might comprise a plurality of network content assets such as one or more images, static text components as well as dynamic components. The preloader's model may thus be able to identify a predicted set of assets (e.g., assets associated with page C) that the client is anticipated to request after requesting the assets associated with pages A and B. In some embodiments the model may be able to provide probabilities of anticipated requests: e.g., based on its analysis, the model may indicate that there is a 75% probability that asset K will be requested by a client that has recently requested asset L, and the preloader may take the probability into account when determining whether to proactively initiate delivery of the predicted asset to the client.

In at least some embodiments, a preloader may use one or more characteristics of a given client request to determine whether to perform an asset preload operation using the model. In one embodiment, one or more preload indicator assets, such as a particular browser-executable script file name "magic.js" in environments where the JavaScript™ scripting language is supported, may be identified to serve as triggers for preload operations. (JavaScript™ is just one example of a scripting language that may be used, and "magic.js" is just an example name of a script file that could be used. In general, languages other than JavaScript™, and techniques other than the use of dynamically generated scripts, may be used for preload triggering in various embodiments.) Various content providers (e.g., web site operators) may be notified in some embodiments that, in order to take advantage of the preload feature to obtain the best possible website performance, web pages provided from their sites should include respective requests for the preload indicator assets. For example, if the operator for a website with a home page URL www.website1.com/home.html wishes to use the preloader feature, the operator may be notified that home.html page (and other pages of www.website1.com) should include a request for "magic.js". In some scenarios more detailed guidance may be provided to the content provider as to how to use the preload indicator asset: for example, in implementations where the various static and dynamic components on a given page are expected to be processed by a web browser in order, the content provider may be instructed to include the request for "magic.js" in a component located close to the end of the page, so that any processing or overhead related to preload causes minimum interference with processing related to other non-preload-related components of the page. In some embodiments, enhanced web browsers, or plugins for web browsers, may be configured to add requests for preloader indicator assets, and/or requests for predicted assets, to client requests.

Continuing with the "magic.js" example scenario, when the preloader determines that a given client request includes a request for magic.js, this may serve as a signal to the preloader to determine whether proactive delivery of assets should be attempted based on the client's current request or current request sequence. The preloader may cause the contents of "magic.js" to be generated dynamically based on the model's prediction of additional assets likely to be requested soon by the client. The contents of this dynamically generated "magic.js" script may then be transmitted to the client for execution by the client's browser. When the client's browser executes the dynamically generated script, requests for one or more of the predicted assets may be generated. Such requests may result in the predicted assets being transmitted to the client and stored in the client's browser cache in some embodiments, so that they are available locally at the client when and if the assets are actually requested. That is, in such embodiments, the assets of the predicted asset set may not be immediately displayed, but may be retrieved from the appropriate web server or other content source for later display. Any of a number of different types of preload asset indicators, at least some of which may not include scripts, may be used in different embodiments.

In some embodiments, preloading may be targeted to caches at other entities, instead of, or in addition to, being targeted at client browser caches. For example, model predictions may be used to proactively load data into a content cache maintained at an edge server of a content delivery network (CDN), so that subsequent requests from clients may be handled more quickly than if the requested assets had to be loaded on demand when clients request them from the edge servers. Similarly, model predictions may be used to proactively load data from a database server into application server caches in some embodiments. In some embodiments at least some components of the preloader and/or the model may be resident on client devices—e.g., as subcomponents of an enhanced client browser, or as separately-installed components or applications on a client computer, laptop, phone, or tablet. In some scenarios, the preloader and/or the model may be implemented at multiple layers—e.g., with some components or instances at client devices or browsers, others at edge servers or web servers, and others at application servers or back-end databases. The delivery of the predicted assets may be targeted at multiple destination caches in some embodiments—e.g., a single prediction may result in assets being delivered to an edge server and to a client browser by cooperating preloader instances at different layers of the system. Model predictions may also be made based on observations of client request sequences at several different entities in some embodiments—e.g., at an individual user's devices from which the requests originate, or at a web server, an edge server, an application server or a database server.

In at least one embodiment, predictions made with the help of the model may be used for evicting contents from caches. For example, the model may be able to predict when the probability of additional requests for one or more cached assets falls below a certain threshold, making it less useful to retain the assets in the cache. Using this information, the assets may be discarded from the cache, or placed in a list of cached assets identified as good candidates for replacement from the cache. In some embodiments the model may be configured to proactively recommend eviction candidates, while in other embodiments the model may identify eviction candidates in response to specific requests from the preloader or other entities. Thus, in general, the model may be used for preloading assets for which additional requests are expected, and/or for discarding currently cached assets for which the probability of additional requests is deemed low. Just as model-based preloading may be targeted to caches in different layers of a system, model-based eviction operations may also be targeted at different cache layers, such as browser caches, edge server caches, or application server caches.

In one simple implementation, the characteristic of a client request that is used to determine whether a preload operation is to be performed may simply be the presence (or absence) of a requested asset in the model's database of assets for which predictions are available. For example, the model in such a scenario may use a mapping M from each element of a set R of requested assets (or groups of requested assets), to a corresponding element of a set P of predicted assets (or groups of assets). When a client C requests an asset a1, the preloader may check whether a1 is an element of R (i.e., whether a prediction can be found for assets likely to be requested after a1 is requested by C). If such a prediction is found, a preload operation to deliver the corresponding assets in P to client C may be initiated; if R does not contain a1, no preload operation may be initiated. In some implementations, the model may be enhanced based on the actual requests that follow the request for a1, so that preloads based on requests for a1 can be initiated in the future.

If the preloader determines, based on characteristics such as the request for a previously specified indicator asset, that an asset preload operation is to be performed, the preloader may consult or query the model to identify the specific assets to be sent to the client. For example, in one implementation a model may provide a programmatic query interface. A request specifying the currently-requested network content assets, and identification information associated with the requesting client (e.g., an IP address of the client, or cookie-derived client identification) as input may be submitted via such an interface, and the model may respond with a predicted set of assets. The preloader may initiate the delivery of at least some of the identified assets of the predicted set to one or more destination caches on behalf of the client, e.g., for inclusion in the client's browser cache, and/or an edge server cache (which may be shared by many clients). A subset of the predicted set may be delivered in some scenarios, rather than the entire set, based for example on the preloader's determination that some of the predicted assets are likely to already be in the destination cache, or as a result of resource constraints, as described below in further detail. The delivery of the assets to a client device may involve participation of one or more content delivery or content generation system components, depending on the implementation. For example, in some scenarios, at least a portion of the preloader may be implemented as a component incorporated at an edge server of a content delivery network (CDN), where the edge server maintains a cache of the content generated at one or more content generators (which may be termed "origin servers" in some cases). In such a scenario, the preloader may check whether the predicted assets are already present in the edge server's cache. If the predicted assets are present, they may be delivered from the edge server's cache to the client browser; if the predicted assets are not present, they may first be requested from the content generators so that they can be loaded into the edge server cache, and transmitted to the client after the edge server cache receives them. As noted above, in some embodiments the preloader may deliver the predicted assets to the edge server content cache, and may not necessarily transmit them all the way to client browsers. In some embodiments it may be possible for the preloader to direct a content source (such as an application server) to transmit the components directly to the client without intermediate server-side caching.

Not all requests or request sequences analyzed by the preloader may lead to the use of the model, or the proactive delivery of assets to the client. In one implementation, if the analysis of the characteristics of a client's request does not indicate that a preload operation is to be performed, the preloader may simply continue on to analyze the next client request, to determine whether that next client request leads to a preload. In some embodiments, the preloader may obtain feedback regarding the responsiveness of one or more content sites (e.g., using a custom or instrumented browser configured to measure content component load times and provide at least some metrics obtained from those measurements back to the preloader). If the feedback indicates that the performance is satisfactory for a given site, preloading may be reduced or discontinued for some portions of the sites.

In some embodiments, the preloader may be able to identify (e.g., using contents of a User-Agent HTTP header of a client request, or another similar information source) one or more properties of the browser or device from which the client requests are received. For example, the browser name and version may be obtained, which may in turn indicate the maximum size of the corresponding browser cache. Alternatively, in some embodiments it may be possible to deduce whether the requests are being received from a phone or tablet rather than a personal computer or server; this type of information may serve as an indication of the computing performance capabilities or likely memory size at the requesting device. Similarly, in some scenarios the type of network connection being used may be determined or deduced (e.g., whether a cellular phone network is being used, or whether a broadband connection or other high-throughput links are being used). Based on some or all of these factors, the preloader may be able to select an appropriate version of an asset to be preloaded for the client in some embodiments—e.g., for a phone device, a smaller or lower-resolution version of an image file may be preloaded than for devices with larger displays. The version of an asset selected for delivery to a client may be customized in any of several different ways—e.g., in one embodiment, a complete unabridged version of a document asset may be preloaded under certain conditions, while a summarized or abridged version may be preloaded if the preloader detects that the client device or browser is resource-constrained.

The functioning of the model used for predictions of future requests may be controlled in part by a number of modifiable parameters in some embodiments. The parameters may include, for example, an input history depth parameter indicating the number of received network asset requests or URL requests to be used to determine the predicted set, and an output prediction length parameter indicating a targeted size of the predicted set (e.g., in terms of content assets, or in terms of entire URLs with all their associated assets). In a simple example, the history depth may be set to one URL requested, and the output prediction length may also be set to one URL, thus indicating that one predicted URL is to be identified for each requested URL when possible. In another example, a sequence of three requested URLs may be use to predict two anticipated image files. In another embodiment, in which the model provided probability estimates for its predictions, another model parameter may comprise a probability threshold indicating a minimum predicted request probability for an asset to initiate a preload operation for the asset. Cost-related parameters may be included in some embodiments, e.g., so that the estimated resource usage (such as network bandwidth or CPU usage) for preloading, at either the sending entity or the receiving entity or both, is factored into the decision as to whether to perform a given preload. Some or all of the model parameters may be automatically adjusted by the preloader (e.g., based on metrics of effectiveness of the preloads, such as the client-side performance metrics discussed above, or on offline comparisons of actual requests to predicted requests).

In some embodiments, depending on the specific versions of content delivery protocols being used, any of various protocol-specific features may be used to preload the predicted assets. For example, in some implementations, the preloaded content assets may be delivered via the use of one or more embedded HTML elements inserted into a web page at the request of (or by) the preloader, or an inline HTML frame (iframe) such as a hidden iframe. Such hidden iframes or other embedded elements may server as triggers for the preload operations to be initiated, in a manner analogous to the use of the example magic.js script described earlier. Guidance as to where within a page such an iframe or embedded HTML element should be placed (e.g., towards the end of a page, so as not to interfere with the non-preload-related components of the page) may be provided to content generators in some implementations. If the delivery protocol support server-side push operations, the preloader may instruct a web server or other server-side component to transmit the preloaded assets to the client without actually receiving a corresponding request from the client browser. In some embodiments where preloader components or instances are incorporated into the client browser, the preloader may insert requests for one or more model-predicted assets into the original client requests. In some implementations, the preloaded assets may be accompanied by a marker or indicator notifying the receiving browser that the assets are to be cached for later display upon request—i.e., that the assets are not to be displayed immediately. The preloaded assets may include static components (e.g., images or static text) as well as dynamic components (e.g., dynamic HTML elements) in some embodiments. In some embodiments the delivery of at least some of the predicted assets may be implemented asynchronously—i.e., the delivery may be scheduled as a background or low-priority task, relative to the priority of delivering other content components that have already been requested. In at least one implementation, the predicted asset set may include one or more assets from a different web site than at least some of the assets whose requests by the clients that led to the prediction—i.e., the predictions may cross site boundaries in such cases.

The content assets of the predicted set corresponding to a given set of actual requests may change over time in some cases, and may also change from one user to another. For example, in the case of a news web site, one client C1 may start by visiting the site's home page, then visit the sports page, and then typically visit the "top" international news story page (where the "top" page is defined by the news web site, and may change from day to day or even hour to hour). The URL for the specific page that displays the top international news story, as well as at least some of the assets associated with that page, may differ on Jan. 10, 2013 from the corresponding "top" assets on Jan. 11, 2013, for example. Thus the predicted set of assets anticipated to be requested following the home page and the sports page may change over time—i.e., even for the same client and the same input request sequence, the predicted set determined by the model may change from one time period to another. Continuing the example, another client C2 may also start with the home page followed by the sports page, but may then typically visit the business page. Thus, the predicted asset set for C2, based on visits to the home page and sports page, may comprise assets of the business page and not the assets of the top international news page. In some embodiments, the model predictions may be based on request sequence histories from multiple users, from which the most likely anticipated asset sets may be derived for an entire user population considered as a group (e.g., all users whose requests originate from a particular domain may be considered as one group, or users from a particular geographical region may be considered a group, or all users regardless of their location or affiliation may be considered as one large group for making predictions). In other embodiments, predictions may be made on a per-user basis instead of being based on analysis of requests from numerous users. The extent to which predictions are to be customized for individual users may itself be governed by a tunable parameter in some embodiments—e.g., in one implementation, initially the predictions may be based on requests from all users, and later, as more request records are collected, predictions may be customized based on smaller groups or on request streams from individual users.

Example System Environments

FIG. 1 illustrates an example system environment, according to at least some embodiments. System 100 comprises a content delivery network (CDN) 190 with a plurality of edge servers 120 (e.g., edge server 120A, 120B or 120C), each of which is configured to store content originally generated at one or more origin servers 112 within a respective content cache 125 for delivery to clients 148 (such as clients 148A, 148B, 148C, or 148D). In the illustrated example, three origin servers 112A, 112B and 112C (which may also be referred to as content generators or content generating servers) are shown, with respective sets of generated network content 114A, 114B and 114C. As shown by the double-edged arrows between the origin servers 112 and the edge servers 120, each origin server may provide content for caching at one or more edge servers. Content generated at origin server 112A may be cached at edge servers 120A, 120B and/or 120C, for example, while content generated at origin server 112B may be cached at edge servers 120A and/or 120C. The various edge servers 120 may be geographically dispersed, so as to provide content efficiently to a respective set of clients at nearby locations. For example, each edge server shown may be located at a data center in a different state, or a different country, than the other edge servers. In some implementations, requests from the various clients 148 may be routed to the nearest available edge server via an intermediary routing service, such as a domain name service, that is aware of the locations of the edge servers.

In system 100, each edge server is shown with a respective server-side preloader instance 180—e.g., edge server 120A has associated preloader instance 180A, edge server 120B has a preloader instance 180B, and edge server 120C has preloader instance 180C. Each preloader instance may comprise one or more executable components and/or data sets in some embodiments. Each preloader instance may also have access to a predictive model, as shown in the depicted embodiment, where preloader instance 180A accesses predictive model instance 135A, preloader instance 180B accesses predictive model instance 135B, and preloader instance 180C accesses predictive model instance 135C. The various preloader instances may coordinate their functionality to varying degrees, depending on the implementation. For example, in some tightly-coupled implementations, each preloader instance may be expected to initiate proactive delivery of same predicted set of assets for a given actual request sequence (and therefore each preloader instance may rely on the same model mappings); in other, more loosely-coupled implementations, each preloader instance may utilize a slightly different model that may make slightly different predictions, so the preloaded assets may differ for the same input request sequence. The term "preloader" may be used synonymously herein for the term "preloader instance", and the term "model" may be used synonymously for the term "model instance". Each model instance 135 may in turn comprise one or more executable components and/or data sets that may be used to generate and/or store predictions in some embodiments. It is noted that although a distributed model implementation (with multiple model instances) is depicted in FIG. 1, other implementations may be deployed in other embodiments—for example, there may a single model instance with a single consolidated data set used for making/storing predictions in some embodiments, and the various preloader instances 180 may be responsible for communicating with the single model instance to obtain predictions of anticipated asset requests from clients. In the depicted embodiment, some preloader and model components or instances may be implemented on client devices. For example, browser 160C of client 148C comprises a client-side preloader 182A and a client-side model 137A. In the case of client 148D, client-side preloader 182B and client-side model 137B are external to the client browser 160D. Each client browser 160 comprises a respective cache 161 (e.g., client 148A's browser 160A comprises cache 161A) into which assets predicted either by the server-side models, the client-side models, or both, may be preloaded.

In some embodiments, each edge server 120 may be configured to generate request logs, or otherwise capture request sequence information (as well as request headers, IP addresses of clients 148) and the like, and the collected request sequences may be used to generate the predictive models 135. In some embodiments, request sequence information used for the model may also be obtained directly from client browsers 160. Depending on the implementation and on such factors as the volume of requests, the costs of sharing request sequence histories across networks, and so on, the predictions made by a given model instance 135 may be derived from request sequence information gathered at a single edge server, at multiple edge servers, or at browsers and one or more edge servers. In some implementations, edge servers 120 may serve only a subset of requests submitted by clients 148—for example, in one implementation, requests for some types of dynamically-generated content may be handled by the origin servers rather than the edge servers. In such cases, the models may be configured to utilize request sequence histories obtained from origin servers 112 as well. In at least one implementation, the origin servers themselves may comprise multiple tiers—e.g., application server tiers, database servers, and the like, and request sequence logs from one or more of such tiers may be utilized for model predictions. The model instances (e.g., server-side instances 135 and/or client-side instances 137) may be operable to determine a predicted set of one or more additional network content assets anticipated to be requested by a client 148 after the client has requested a given set of one or more network content assets, based at least in part on an analysis of a history of received network content asset requests obtained from one or more of the different sources discussed above. In at least some embodiments, the client-side and server-side components or instances of the models and/or preloaders may cooperate closely with each other—e.g., predictions made by a client-side model may be based partly on request sequence analysis performed at the server-side and partly on analysis of requests from the client device, and corresponding preload operations may be performed by either client-side preloaders, server-side preloaders, or by both types of preloaders.

In the embodiment shown in FIG. 1, the preloader at a given edge server 120 or at a client 148 may monitor client requests. Based on one or more characteristics of a given current client request (or sequence of requests) being considered, the preloader 180 or 182 may determine whether to initiate an asset preload, and if an asset preload is to be initiated, the destination cache or caches to which the assets should be delivered. For example, preloader 180A may check whether one of the assets requested by a client 148A is a previously-specified preload indicator or trigger, such as a "magic.js" JavaScript™ file, and if such an indictor is detected, the preloader 180A may decide to initiate an asset preload for client 148A. If a decision to preload is made, the preloader may then identify, e.g., using a query interface supported by server-side model 135 or client-side model 137, the set of assets to be preloaded on behalf of the client. The preloader may initiate delivery of at least some of the identified assets to the client 148, e.g., for storage in a browser cache 161 of the client browser 160 (or at a content cache 125 at an edge server likely to be used by the client) until the client 148 actually requests the predicted assets. In cases where the predictions are accurate and the data is preloaded into the browser cache 161, when the client 148 makes a subsequent request for one of the preloaded assets, the asset may be served from the client's browser cache 161, without incurring any delays that might otherwise have resulted due to the time it takes for network transfers from the edge servers or origin servers. In embodiments where preloading is performed for edge server caches 125, but does not extend to the client browser layer, subsequent requests for the predicted assets may still be handled more quickly than they may have been handled in the absence of preloading.

In addition to being used for proactive preloading of assets, models 135 and/or 137 may be used for eviction operations from caches 125 and/or 161 in some embodiments. The models may be able to predict when an asset that is currently cached is unlikely to be required in the future, or to identify the particular asset or assets that are least likely to be requested again. Accordingly, assets identified as having low request probabilities may be discarded from their respective caches, and/or placed in a list of candidates to be evicted from the caches in preference to other assets. In some embodiments, server-side models 135 and/or client-side models 137 may be used largely or exclusively for eviction decisions, while in other embodiments the models may be used largely or exclusively for preload operations.

Figure 2:
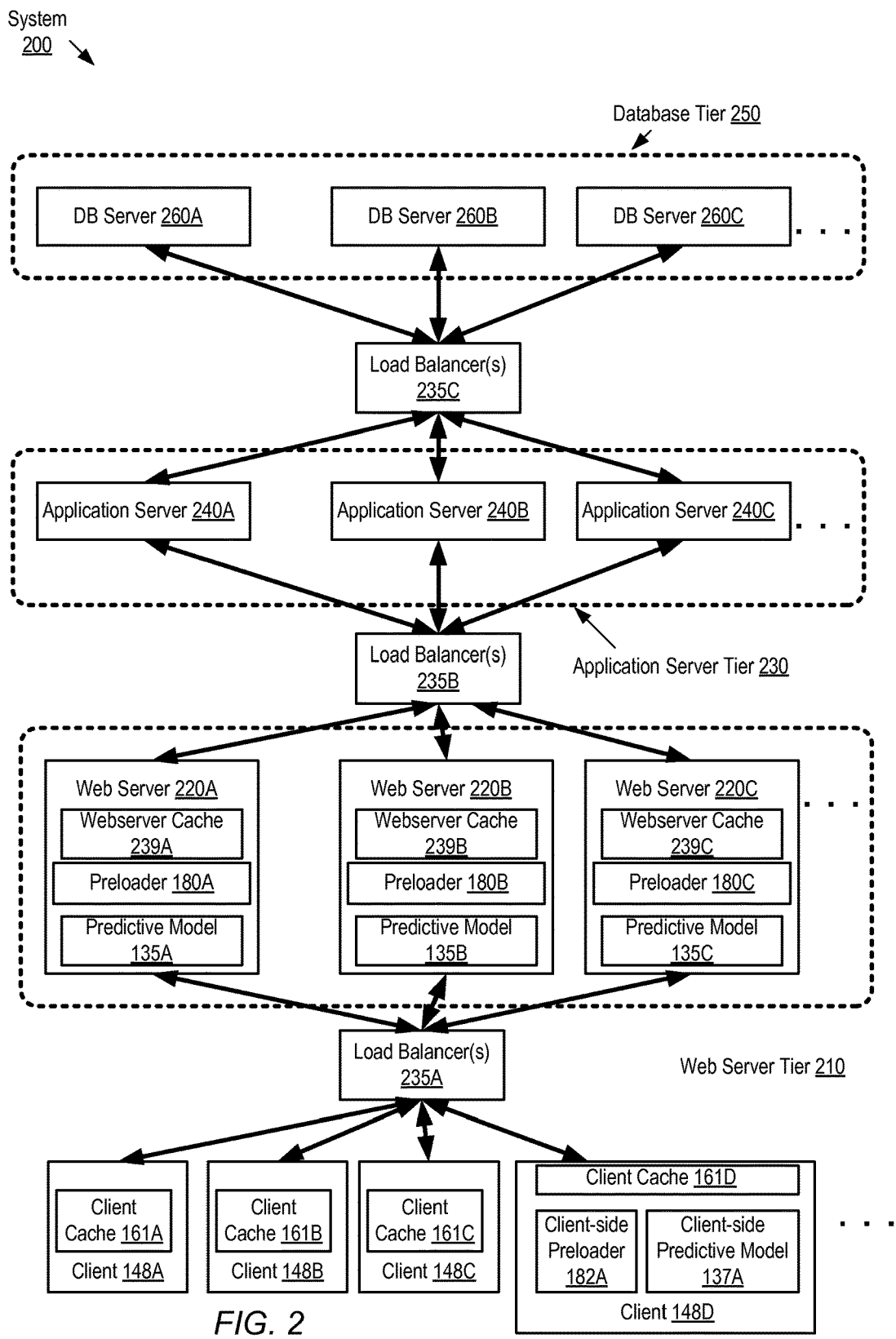
FIG. 2 illustrates another example system environment comprising a multi-tier application, according to at least some embodiments.

FIG. 2 illustrates another example system environment, comprising a multi-tier application in which server-side preloader instances 180 are included at a web server tier 210, and client-side preloaders 182 may be instantiated at at least a subset of client devices, according to at least some embodiments. The front-end web tier 210 comprises a plurality of web servers 220 (e.g., 220A, 220B and 220C) to which incoming requests from clients 148 are distributed via one or more load balancers 235A. A given web server 220 may be able to respond to a client's request itself, or may have to obtain at least some portions of the requested assets from back-end tiers, such as the application server tier 230 or the database tier 250. Each web server 220 comprises a respective web server cache 239, e.g., cache 239A at web server 220A. Requests from the web server tier 210 to the application server tier 230 may also be load balanced (via one or more load balancers 235B), and at least some results of such requests may be cached in the web server caches 239. Some client requests may require database queries to be run, and/or may result in updates to the data stored in the database tier; such database requests may be passed to one of the database servers 260 (e.g., 260A, 260B or 260C) from the application server instance 240 (240A, 240B or 240C) responsible for handling the client request transmitted to the application server instance by the web server tier. Requests between the tiers 210, 230 and 250 may be load-balanced using some combination of hardware and/or software load balancers 235 in some implementations. The servers within a given tier may be organized as a loosely-coupled or tightly-coupled cluster in different implementations.

In the depicted embodiment, each web server 220 comprises a corresponding server-side preloader instance 180— e.g., web server 220A comprises preloader instance 180A, web server 220B comprises preloader instance 180B, and so on. The preloader instance may be implemented as a web server plugin in some embodiments. Each preloader instance 180 in turn may utilize a predictive model subcomponent component 135—e.g., preloader 180A uses model 135A, preloader 180B uses model 135B, and preloader 180C uses model 135C. As discussed with reference to the preloader and model instances of FIG. 1, a single consolidated server-side model may be used in some implementations instead of the multiple instance shown, and/or the model may be implemented as a subcomponent of a preloader. Some subset (or all) of the clients 148 may have their own client-side preloader components or instances 182 and/or client-side model components or instances 137, such as client 148D's preloader 182A and client-side predictive model 137A. In at least one embodiment, server-side preloader instances and associated predictive models may be implemented at other tiers (such as the application server tier 230) instead of, or in addition to, at the web server tier 210 as shown in FIG. 2. Although each of the several tiers is shown as comprising a plurality of servers in FIG. 2, preloaders using predictive models may be implemented within a simple configuration comprising a single web server (with or without backend tiers) in some embodiments.

The predictive models 135 and 137 in the embodiment shown in FIG. 2 may be configured to make predictions using information extracted from web server logs, network connection metadata, website analytics tools, browser plugins, and the like. In some embodiments request histories at the application server tier 230 and/or the database tier 250 may also be used to generate predictions. In a manner similar to that described above with reference to FIG. 1, a given preloader instance 180 or 182 may determine whether or not to initiate a preload operation based on one or more characteristics of a client's request or request sequence, such as whether a preload indicator asset is requested, or whether the requested asset set has an associated predicted asset set according to the model 135 or 137. If a decision to perform a preload is made, the preloader may identify (using the model) exactly which set of assets is to be preloaded, and to which cache(s) (e.g., a client cache 161 and/or a web server cache 239). In at least some embodiments, additional information regarding the client's browser and/or client device may be used to select a device-appropriate or browser-appropriate version of a given asset to be delivered on behalf of the client. Delivery to the destination cache(s) of the identified assets may then be initiated. In some cases the assets may already be present in a web server cache or in a web server's previously-populated document hierarchy. In other cases the assets may have to be obtained from the application server tier 230 and/or the database tier 150 before being transmitted to the client 148. In at least some implementations, preload-associated tasks (such as requests to the application server tier 230, or database queries from the application server tier 230 to the database tier 250) may be assigned a lower priority than tasks for already-requested content, so as to minimize any impact of preloading.

As briefly mentioned above, the origin servers 112 of FIG. 1 may themselves comprise multiple application tiers similar to those shown in FIG. 2 in some embodiments; in such embodiments, the edge servers 120 may simply be considered as yet another tier. Preloaders may be present at only the edge server layers in some such embodiments, and also at the web server tier (or other tiers) of the origin servers in other embodiments. Each tier with preloaders may attempt to predict requests from the next tier (e.g., the web server tier preloaders may predict requests from the edge server tier) and deliver predicted content assets to the entities at the next tier proactively, so as to enhance responsiveness at the next tier, and ultimately to improve the quality of interactions as seen by the clients 148.

Predictive Model Components

Figure 3:
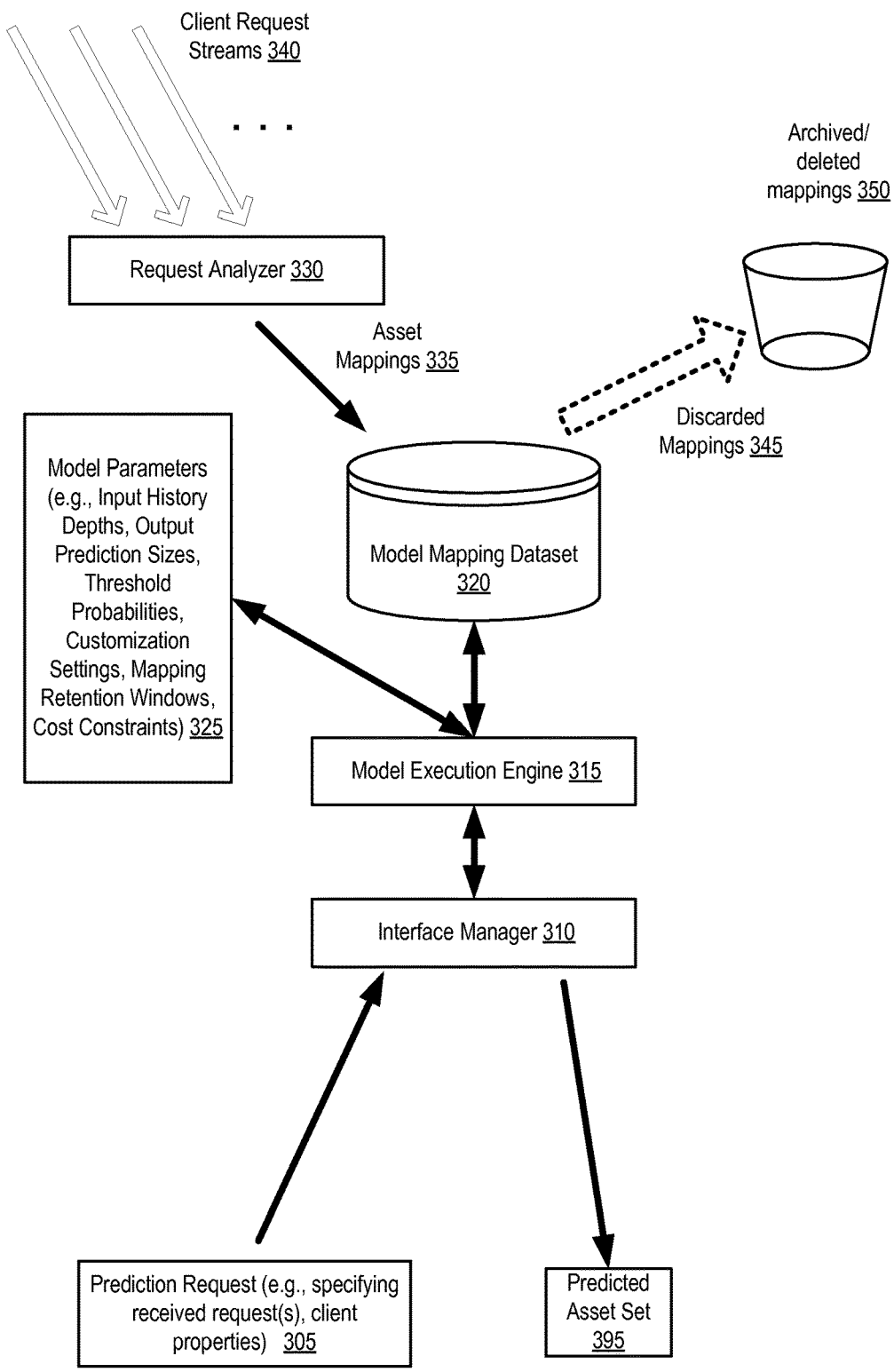
FIG. 3 illustrates example components of a predictive model for network content asset requests, according to at least some embodiments.

FIG. 3 illustrates example components of a predictive model for network content asset requests, according to at least some embodiments. In the illustrated embodiment, the model comprises an interface manager 310, an execution engine 315, a request analyzer 330, and a current mapping dataset 320. A number of model parameters 325 may be modified or tuned in some embodiments to adjust the resource consumption (e.g., CPU cycles, memory, or storage space) associated with the model, and/or to attempt to enhance the accuracy of the model's predictions. The high-level goal of the model may be to provide, in response to various prediction requests 305, corresponding predicted asset sets 395 indicating which (if any) assets should be preloaded for various clients. A single instance of each of the model subcomponents is shown in FIG. 3. However, in some embodiments, one or more of the subcomponents may be implemented in a distributed fashion: for example, an instance of a model execution engine 315 may be implemented at each edge server 120 or web server 220, a copy or a cached subset of a current mapping dataset 320 may be maintained at each edge server or web server, a request analyzer instance may be executed at each entity where client requests are received or generated, and so on.

In the embodiment shown in FIG. 3, a request analyzer is responsible for examining client request streams 340, and, based on the client requests, generating asset mappings 335 for inclusion within the current mapping dataset 320 of the model. A given asset mapping 335 may, in one embodiment, represent a probabilistic relationship between a set of received client asset requests, and one or more predicted assets that the client is expected (with some probability) to request within the near future. Depending on the computing, memory and storage resources available for the model, and the settings of various parameters described below, mappings with different levels of sophistication and detail may be generated by the request analyzer. In a very simple implementation, mappings may be generated based on analysis of pairs of asset requests (a1, a2) that occur in various client request streams. By examining such pairs over a large enough collection of client request logs, it may be possible for the request analyzer 330 to determine that, given a request for asset X at time T1, there is an 80% probability than asset Y will be requested within a time window T-delta, and the mapping between X and Y may be stored within current mapping dataset 320. Other implementations may consider N-tuples of asset requests, such as request sequences for five assets (a1, a2, a3, a4, a5), and estimate the probability that, given requests for assets K, L and M, assets N and P will be requested shortly thereafter. In some implementations, a plurality of predicted asset sets with respective probabilities may be generated, and multiple mappings for the same input request sequence may be retained in the dataset 320, with respective probabilities.

Over time, the size of the mapping dataset may grow substantially, especially for popular content sites. Furthermore, some of the mappings may simply become inapplicable as the content that is available from a given content provider is modified—e.g., news stories may be removed from a news web site within some period of time, so a mapping that indicates that a given news story web page is likely to be requested after an earlier request for a different page may no longer be valid when the news story web page is removed from the site by the site owner. Accordingly, at least in some embodiments, some mappings 345 may be discarded or archived (e.g., placed in a mapping archive or deleted mapping repository 350) at appropriate times, thereby reducing the size of the current mapping dataset 320 and ensuring that invalid mappings do not lead to erroneous predictions and associated overhead.

A number of different modifiable parameters 325 may govern various aspects of model functionality in some embodiments. For example, an input history depth parameter may be used to determine how many received or past asset requests are to be used as input for identifying future asset requests—for example, whether a sequence of five requests is to be used to make a prediction, or a sequence of two requests is to be used for predictions. An output prediction size parameter may be used to determine how may future requests are to be identified for a given input request set—e.g., whether two future requests should be predicted, or whether four requests should be predicted. In some embodiments, one or more threshold probability parameters may be set, so that, for example, the model may be directed to provide predicted sets of assets only if the probability that those assets will be requested is estimated to exceed a specified threshold. If a threshold of 80% probability is set, for example, and the model is only able to predict that asset set X is likely to be requested with a 60% probability, the model may not provide the prediction, so that the overhead of a preload that may not turn out to be useful is avoided. Cost-related parameters may also be used in some embodiments, e.g., indicating maximum thresholds for estimated preloading-related resource usage (such as the amount of network bandwidth likely to be used, or the likely CPU overhead for performing the preload, at either the source of the preloaded data or the destination) to determine whether to perform a given preload. In some implementations, parameters related to cache eviction policies may also be implemented—e.g., the minimum probability of re-access required for an asset to be retained in a cache may be specified as a parameter.

In some embodiments, the model may be instructed, via one or more customization parameter settings, whether predictions are to be customized for individual clients or groups of clients, or whether predictions should be developed for aggregated or "average" users. Further details regarding some aspects of customized predictions are provided below in conjunction with the descriptions of FIG. 4 and FIG. 5. Customization approaches may fall along a continuum (instead of being set as discrete values) in some embodiments: for example, while request sequences may be analyzed on a per-user or a per-user-group basis, aggregated predictions based on request sequences observed for all users may be used until a sufficiently large dataset is gathered for a given user or group. Once sufficient request history (where the sufficiency may be governed by other parameters such as statistical confidence level thresholds) is gathered, the model may start making custom predictions in some such embodiments. Other parameters 325 may govern for example how long various mappings are to be retained in the current dataset 320 before being discarded or archived, or whether mappings are to be discarded based on notifications from content owners (e.g., a content site owner may notify the model when content is deleted from the site, so any mappings that have the deleted content in the input or predicted sets may be discarded).

The interface manager 310 may implement one or more programmatic interfaces in some embodiments, such as application programming interfaces (APIs) through which prediction requests may be sent, and through which predicted asset sets 395 may be indicated. The execution engine may be responsible in some embodiments for a number of functions, such as extracting predictions from the dataset, implementing parameter changes (either in response to administrative requests, or as a result of self-tuning decisions based on various metrics of resource consumption and/or prediction accuracy), initiating the archival or deletion of mappings, maintaining a desired level of consistency between the datasets of different model instances in a distributed model implementation, and so on. The execution engine 315 may gather metrics regarding how much CPU, memory and/or storage space is being used by the various model components, and use those metrics to make auto-tuning decisions (or provide reports on the metrics to administrators) in various embodiments. A subcomponent of the execution engine may also be responsible for determining how successful the predictions are (e.g., by analysis of actual request sequences) and modifying/removing the prediction mappings in dataset 320 accordingly in some embodiments.

At least in some implementations, the prediction requests 305 may include some metadata or properties of the client on whose behalf the prediction is being requested—e.g., what kind of computing device the client is using, which browser the client is using, and so on. In some such implementations, the predicted asset set 395 may include versions of assets that are selected from a set of alternative versions based on the client properties—e.g., a smaller image file with lower resolution may be provided if the client is using a phone than if the client is using a personal computer.

Figure 4:
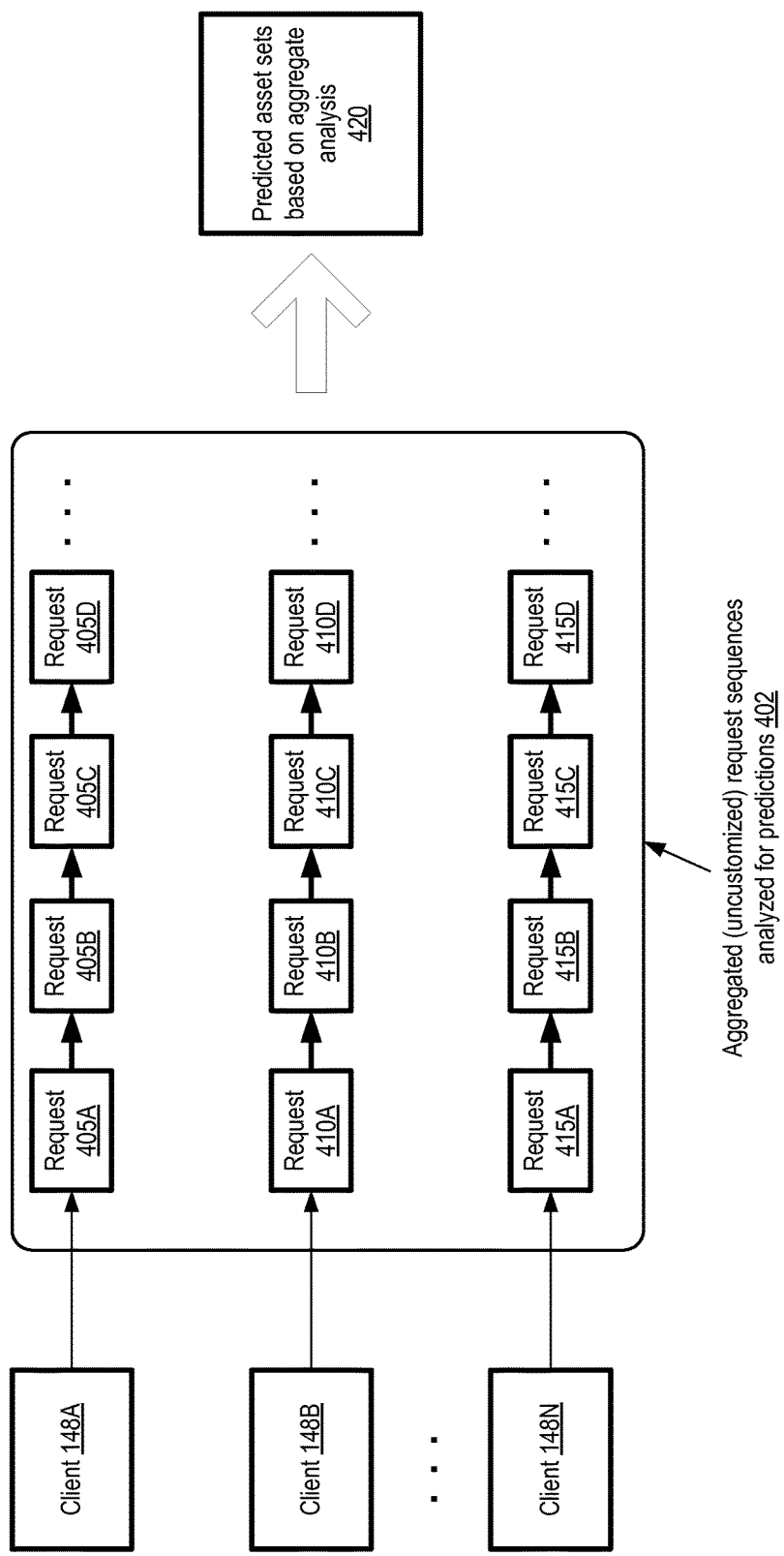
FIG. 4 illustrates the use of aggregated request sequence information by a model for making asset request predictions, according to at least some embodiments.

FIG. 4 illustrates the use of aggregated request sequence information by a model for making generic (i.e., not client-specific) asset request predictions, according to at least some embodiments. In the depicted embodiment, information about network content asset requests from a plurality of clients such as 148A, 148B and 148N is collected and then analyzed as an aggregate. Client 148A is shown as submitting content asset requests in the following order: 405A, followed by 405B, 405C and 405D; client 148B submits requests in the order 410A, 410B, 410C and 410B, while client 148N is shown as submitting requests in the order 415A, 415B, 415C and 415D. Information about which specific assets were requested in sequence may be gathered, e.g., by a request analyzer 330, based on the relative timing of each request from each requester, based on Referer header contents, or based on other factors. The combined request sequence information may then be examined to generate the asset mappings 335 to be used in the model. Factors such as the number of requested assets to be considered as input for a prediction may be controlled by model parameters.

In some embodiments in which the aggregated analysis approach shown in FIG. 4 is used, equal weight may be given to the request sequences from all the different clients when generating the asset mappings for the model. For example, consider a scenario where the request sequence for client 148A includes three occurrences of the asset request pattern a1-a2-a5 (i.e., a request for asset a1 is followed shortly by a request for asset a2 and then a request for asset a5), and the request sequence for client 148B includes ten occurrences of the pattern a1-a2-a4. Since all the request patterns are given equal weight, and the a1-a2-a4 pattern is much more frequent than the a1-a2-a5 pattern, the request analyzer may generate a mapping that suggests that based on a request for a1 followed by a request for a2, the asset a4 should be preloaded, regardless of which client makes the a1-a2 requests. Such an aggregating prediction procedure may have the advantage of being simple to implement, and may require fewer resources (e.g., memory) than more customized procedures such as that shown in FIG. 5.

It is noted that in at least some implementations, there may be a delay between successive requests of a request sequence from a given client 148. For example, a client 148A may request a web page P1, and spend some time reading the contents of P1 before clicking on a link to page P2. The request logs captured at the corresponding web site or edge server may (especially for busy sites) have hundreds or thousands of other entries between two successive request entries from the same client. Thus, a non-trivial amount of computing power and/or storage may be needed to extract or construct accurate request streams for various clients in some embodiments.

Figure 5:
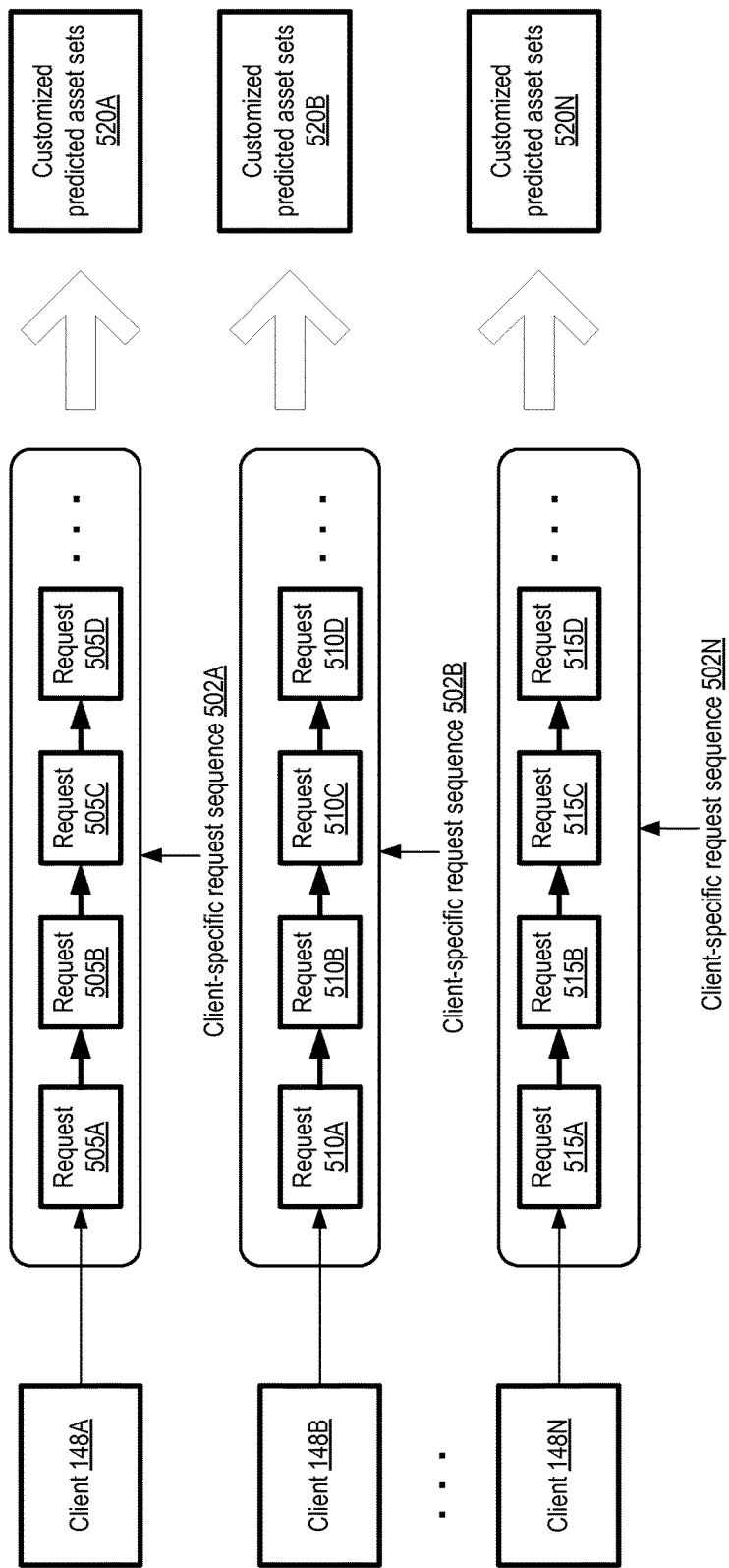
FIG. 5 illustrates the generation of customized predictions by a model using client-specific request histories as input, according to at least some embodiments.

FIG. 5 illustrates the generation of customized predictions by a model using client-specific request histories as input, according to at least some embodiments. In contrast to the implementation illustrated in FIG. 4, in which generic predictions were made based on analyzing all the request streams collectively, custom client-specific predictions or mappings may be generated in the embodiment shown in FIG. 5. Thus, asset mappings for client 148A may be made based solely or largely on the analysis of requests by that client, such as requests 505A, 505B, 505C and 505D, so that predicted asset sets 520A for client 148A may not be affected by the request sequences of other clients. Similarly, predicted asset sets 520B for client 148B may be based on client 148B's request history, and predicted asset sets 520N may be based on client 148N's request history.

Reconsidering the example discussed above with respect to FIG. 4, where the request sequence for client 148A includes three occurrences of the asset request pattern a1-a2-a5, and the request sequence for client 148B includes ten occurrences of the pattern a1-a2-a4, different predictions would be made for client 148A than for client 148B in the embodiment illustrated in FIG. 5. Since only the request patterns for client 148A would be considered when making predictions for client 148A, the request analyzer may generate a custom mapping for client 148A that suggests that based on a request for a1 followed by a request for a2, the asset a4 should be preloaded. For client 148B, a different mapping may be generated, recommending the preloading of asset a5 if the a1-a2 pattern is detected. Generating and using custom mappings for each client 148 may result in more accurate predictions, at the potential cost of higher memory and storage costs in some implementations.

In some embodiments, a hybrid approach combining aspects of the approaches shown in FIG. 4 and FIG. 5 may be used. For example, mappings may be generated based on analysis of grouped request sequences from "similar" clients—e.g., request sequences from clients with IP addresses within a given range may be aggregated for analysis. Clients 148 may be grouped on the basis of the similarity in their overall request patterns in some embodiments, e.g., clients whose request sequences include the patterns a1-a2-a3-a4-a5-a6-a7, a1-a9-a3-a4-a5-a6-a7, and a1-a2-a3-a4-a8-a6-a7 may all be deemed to be similar enough to generate common predictions based on the collection of their request streams.

Figure 6:
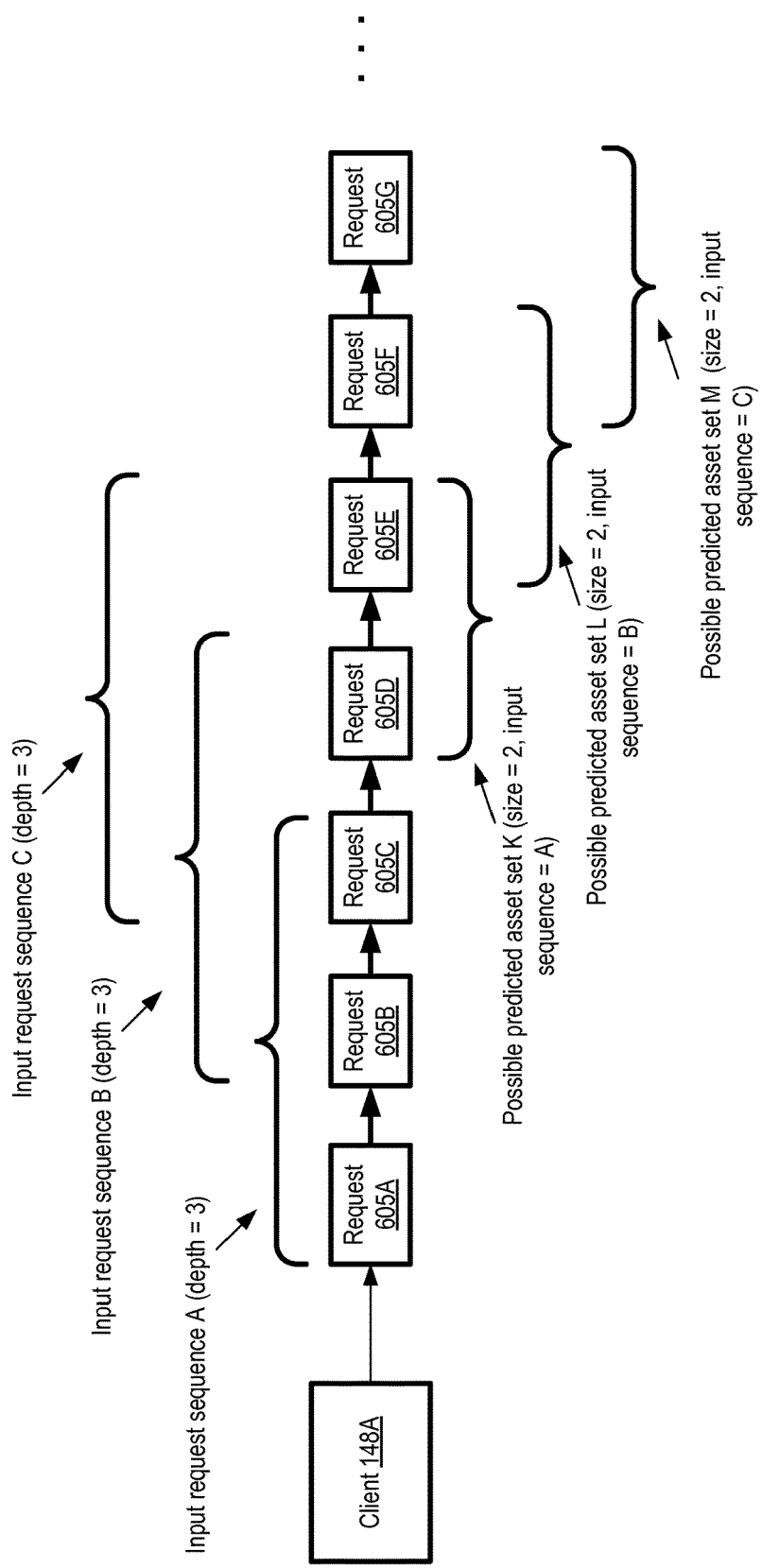
FIG. 6 illustrates an example of the use by a model of input request sequences of a specified size to generate predicted asset sets of a desired size, according to at least some embodiments.

FIG. 6 illustrates an example of the use by a predictive model of input request sequences of a specified size to generate predicted asset sets of a desired size, according to at least some embodiments. A subcomponent of the model, such as a request analyzer 330, may be responsible for identifying (e.g., using logs generated at an edge server or web server) a sequence of network asset requests submitted by a client such as 148A. In the illustrated example, client 148A has submitted requests 605A, 605B, 605C, 605D, 605E, 605F, and 605G in that order. An input request sequence depth parameter of the model is set to "3", and a predicted asset set size parameter is set to "2". That is, model parameters have been set such that three requests from the client are to be used to make predictions about the next two requests that the client is anticipated to make. Accordingly, the request analyzer determines, for each request sequence of length three, how frequently the two requests that follow are repeated over time, to generate the asset mappings between received requests and predicted requests. Input request sequence A, for example, comprises requests 605A-605C, which are followed by requests 605D-605E. In examining the request stream submitted by client 148A, which may in general comprise many more requests than shown in FIG. 6, the request analyzer may keep track of how often the content assets requested in 605A-605C are requested in that sequence, and how often that set of requests is immediately followed by requests for assets of 605D and 605E. If a sufficient number of such matching sequences are found, the request analyzer component of the model may decide to generate a mapping between the assets of 605A-605C and the assets of 605D-605E. That is, when a subsequent request sequence matching 605A-605C is observed for client 148A (or some other client, depending on the customization settings in use), and a prediction request corresponding to that sequence is received, the model may predict that the assets requested in 605D-605E are likely to be requested soon by the client. Similarly, for input request sequence B, the assets requested in 605E and 605F may be chosen as the predicted set if the corresponding pattern is frequently observed in the analyzed request stream, and for input request sequence C, the assets requested in 605F and 605G may be selected as the predicted set based on the number of times that pattern is detected. In some embodiments, the model may be capable of automatically adjusting the input sequence depth to be used to make predictions of a desired asset set size, based on a statistical analysis of the request sequences available.

Methods of Predicting and Preloading Network Assets

Figure 7:
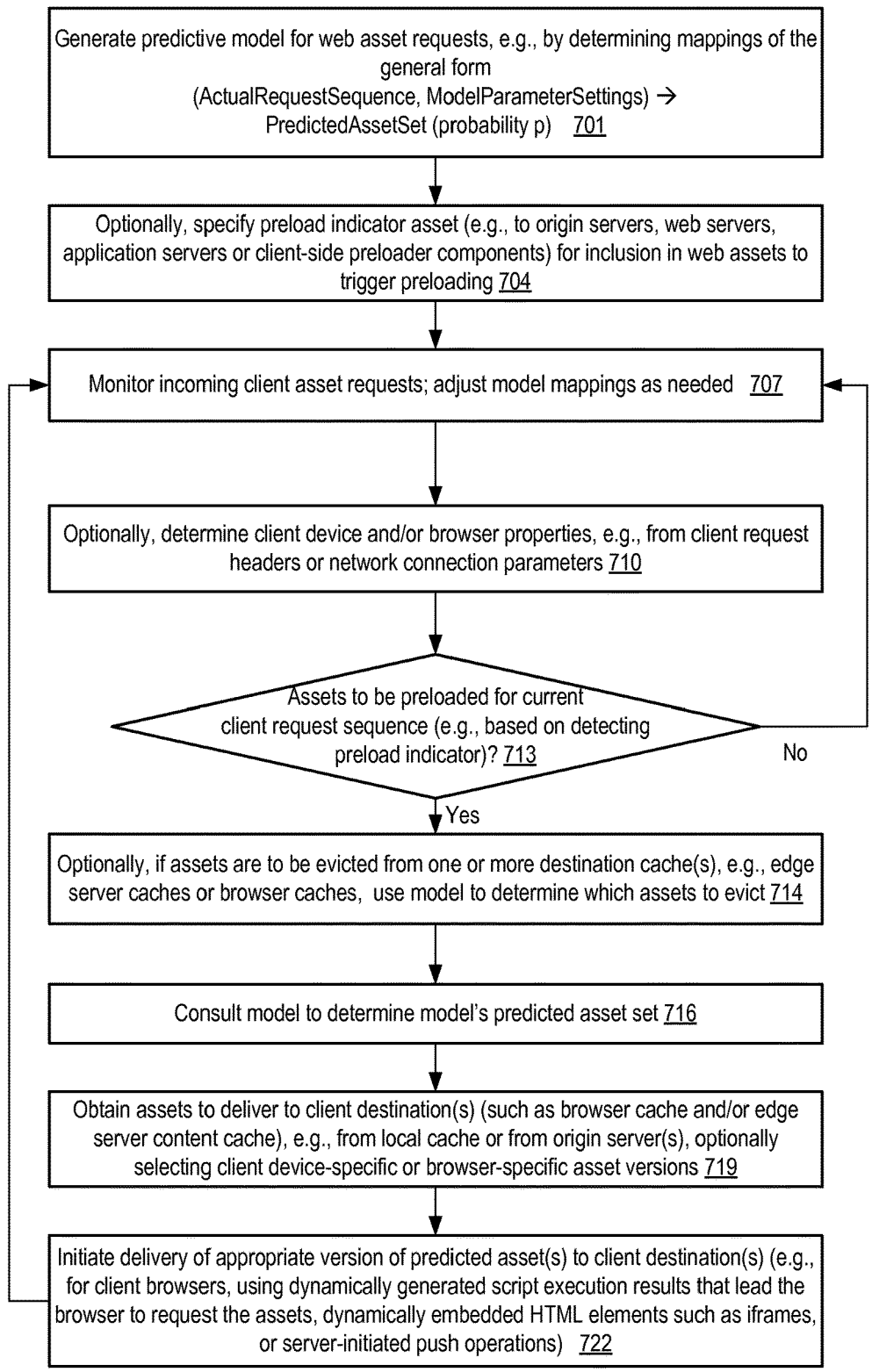
FIG. 7 is a flow diagram illustrating aspects of the operation of a preloader configured to utilize a predictive model to initiate proactive delivery of network content to clients, according to at least some embodiments.

FIG. 7 is a flow diagram illustrating aspects of the operation of a preloader configured to utilize a predictive model to initiate proactive delivery of network content to clients, according to at least some embodiments. As shown in element 701 of FIG. 7, a predictive model may be generated for web asset requests. The model may include mappings of the general form (ActualRequestSequence, ModelParameterSettings)→PredictedAssetSet(probability p), which may be derived from request sequence logs and other collected metadata. That is, the model may, in general, be able to predict, for a given actual request sequence and a particular collection of model parameter settings, an anticipated set of assets that a client is likely (with probability p) to request after the actual request sequence. In some implementations, only predictions that have associated probabilities above a threshold level may be retained for use. In other implementations, the highest-probability prediction for a given actual result sequence may be retained for the model (even if the highest probability does not meet the threshold parameter, or if no probability threshold is specified at all), and the decision as to whether a preload operation is to be performed or not may be deferred until a request specifying that the input actual request sequence has been detected again is received. When such a request is received in such a scenario, in some embodiments the preloader may determine, for example based on the current levels of resource utilization at the delivery server (or the client) whether a preload operation should be performed—for example, if the delivery server or client is relatively lightly loaded, assets may be delivered even if the associated probability is not very high. In some embodiments, the model may not explicitly store probability values, and may simply store mappings identifying the most likely predicted asset requests based on analyzed request streams. The model mappings may be continuously improved in at least some embodiments by taking into account new requests as they are received, and/or by removing or deleting mappings that are no longer useful, e.g., as the content assets accessible by the clients are changed by the content owners.

In some embodiments, guidance or instructions regarding the use of a preload indicator asset may be provided to content generators (e.g., an application server that forms a backend tier for a web server, or origin servers from which content is cached at edge servers of a content delivery network) or to client-side preloader instances or components, as shown in element 704. The guidance may indicate, for example, that in order to trigger the preload functionality as a result of a request for a given web page WP, that web page WP should itself include a request for a specified indicator asset such as a specified script file. An example of the use of such a script file as a preload indicator is provided in FIG. 8. Various types of non-script preload indicators, such as embedded HTML elements, special HTML strings, or inline frames (iframes) may be used in different embodiments.

The preloader may monitor incoming client asset requests, as indicated in element 707. This monitoring may serve at least two purposes in some embodiments. First, incoming request sequences may serve as inputs to the model, so that predicted assets (if any predictions are provided by the model) can be preloaded. Second, the incoming request sequences can be used to validate, enhance and/or update the model's predictions. In at least some implementations, it may be possible to determine some properties of the client device (e.g., personal computer, tablet or phone) being used for submitting the client's requests, and/or some properties of the client's browser (e.g., the browser vendor and version, which may in turn indicate browser cache size limits and the like) from the client's requests and or the network connection being used (element 710). If such client-side properties can be ascertained, they may be used to select specific versions of assets to be preloaded, as described below in further detail with respect to element 719.

If, based on the characteristics of an incoming client request sequence (where the sequence size may be determined by a tunable parameter), a determination is made that assets are to be preloaded for that client (as determined in element 713), the model may be consulted to identify specifically which asset or assets should be preloaded (element 716). If a decision is made that the current client request sequence being considered should not lead to assets being preloaded (as also determined in element 713), the preloader may resume monitoring further client requests (element 707).

If a preload operation is to be performed, in the depicted embodiment the preloader may check whether any assets need to be evicted or replaced from the destination cache(s), e.g., to accommodate the assets to be preloaded. If evictions are required, the preloader may optionally use the model to identify which assets to evict from the caches, and mark the assets as no longer needed or valid (element 714). The assets to be delivered to the appropriate destination cache or caches for the client may be obtained (element 719), either from a local cache accessible to the preloader, or from some other content source such as an application server, database server, or an origin server in the CDN scenario. In at least some implementations, the predicted set of assets may include content generated at a different website or web sites than the website(s) of the assets whose requests led to the prediction. E.g., the model may be able to predict that after client C visits page P1 on website W1, C1 is very likely to access page P2 of website W2. If properties of the client device or client browser were identified, and device-specific or browser-specific versions of the content assets are available, the appropriate versions of the assets may be selected for transmission to the destination cache(s). For example, a summary version of an article may be preloaded instead of a full version. In some embodiments, multiple caches may be loaded as a result of a single prediction—e.g., both an edge server content cache and a client browser cache may be selected as destinations. In some implementations, the preloader may obtain, from the model, a list L1 of the assets that the model predicts will likely be requested soon, but the preloader may decide to initiate delivery of a list L2 of assets that does not exactly match the model's list L1. For example, the model's list L1 may include three large image files f1, f2 and f3 in one scenario. However, the preloader may determine, based on its monitoring of earlier client requests and earlier preloads, that the client is very likely to already have f1 and f2 in its browser cache, so the preloader may initiate the delivery of f3 alone, instead of all three files. In some embodiments, the preloader may decide to deliver only a subset (or none) of the list of assets provided by the model based on other considerations, such as the current estimated resource utilization at the delivery server or the network connection to the client, or even the resource utilization levels at the client if client-side resource usage information is available. Thus, at least in some embodiments, it may be possible for the preloader to make the final determination as to which assets are to be transmitted to the client, which may differ from the recommendations of the model.

After the actual set of assets to be preloaded has been determined, the delivery of the assets to the selected destination(s) may then be initiated (element 722) using any of a number of possible techniques in different embodiments. For example, in the case where the destination is a client browser cache, the assets may be delivered as a result of execution by the client browser of a dynamically generated script, as a result of a request for a dynamically embedded HTML element or iframe, or as a result of a server-side push operation. In some implementations, if a plurality of assets is to be preloaded, the sequence in which the assets are delivered, and the time between initiation of delivery of each of the assets, may be determined by the preloader. For example, it may be possible to predict that a client C1 is very likely to request asset a1, and then, after a few seconds or minutes, asset a2. In such a scenario, the preloader may initiate the transmission of a1, and delay the transmission of a2 relative to a1 based on the expectation of when the assets are likely to be requested by the client. After delivery of the assets is initiated, the preloader may resume monitoring subsequent requests from clients (element 707 onwards) and repeat the process of determining whether additional preload operations are to be performed, and performing the additional preload operations as needed.

As indicated with respect to element 714 above, in some embodiments the model or models may optionally be used for cache eviction-related decisions, such as when a particular asset should be removed from the cache, or which specific assets are least likely to be accessed again and therefore are good candidates for removal from the cache. Such eviction operations may be performed independently of preload operations in some embodiments—e.g., an asset may be evicted or marked for replacement based on some schedule, independently of whether such an eviction is required for an impeding delivery of a predicted asset. In some implementations a model may be configured to generate notifications when it is able to recommend asset evictions from one or more caches, and send the notifications to the preloader, a cache manager, or some other entity, without having received a specific request for such recommendations.

In at least some embodiments, the preloader may obtain feedback or measurements from a number of sources to help adjust or tune its operations. For example, in one embodiment, a special browser plugin (or a special browser version) may be implemented that provides asset load time measurements (obtained at the browser) to the preloader. Additional metrics regarding the utilization of various resources at the delivery servers from which assets are transmitted to the clients, and the network paths over which the assets are transmitted, may also be collected in some embodiments. Such measurements may be used to determine the effectiveness of the preload operations—for example, to determine whether the benefits of preloading justify the resources consumed for preloading.

FIG. 8 is a flow diagram illustrating aspects of the operation of a preloader configured to dynamically generate contents of a script that, when executed by a client browser, results in the delivery to the client of a network content asset identified by a predictive model, according to at least one embodiment. A shown in element 801, in the depicted embodiment, content providers may be notified that they should include a request for a "magic.js" JavaScript™ file in their web pages. In some implementations, where for example the different components making up a web page are evaluated or rendered in a specified order (e.g., in the order in which the components appear from top to bottom of the HTML), the content providers may be guided to include "magic.js" towards the end of the page, so that the evaluation or processing of the script causes minimal interference with the evaluation of other components on the page. An example of the HTML text that may be included in the page is:

<script type="text/javascript" src="magic.js"></script>

It is noted that the name "magic.js" is simply an example, and that any desired script name (or scripting language) may be used in various embodiments. When the included indicator is evaluated by a client browser, the browser submits a request for the specified script file such as "magic.js" to the delivery server (e.g., web server). When the request for the script is received at the delivery server (element 804), this may serve as a trigger to the preloader that the model is to be consulted to determine if a predicted set of assets should be preloaded for the client in the depicted embodiment. The list of assets to be preloaded may then be determined using the model (element 807). For example, the assets to be preloaded may include an image file named "heavyimagefile.jpg". The contents of "magic.js" may then be dynamically generated (element 810) such that the execution of the script at the browser results in the browser requesting (but not immediately displaying) the predicted assets. In the "heavyimagefile.jpg" example, the preloader may generate a custom "magic.js file" with contents similar to the following, whose execution by the browser would result in the delivery of heavyimagefile.jpg to the browser cache:

<script language="JavaScript">
function preloader( )
{
heavyImage=new Image( )

heavyImage.src="heavyimagefilejpg";
}
preloader( );
</script>

When the browser runs this script, the predicted assets (heavyfileimage.jpg in this case) are requested by, and delivered to, the browser (element 813). The asset may be stored in the browser cache until it is explicitly requested for display (in some subsequent client request, if the model's prediction turns out to be accurate).

Use Cases

The techniques described above, of generating predictive models based on received client requests for network content, and then using the models to proactively deliver content to clients, may be used in any environment where it is possible to gather input request sequences from clients, and where sufficient compute and storage resources are available to analyze the request sequences to generate the kinds of predictions described. The techniques may be beneficial in a large number of scenarios, especially where content-rich website pages are set up such that many page requests typically result in several different static and dynamic assets being delivered.

In environments where it is possible to identify the types of devices being used by clients (e.g., smart phones versus tablets versus desktops/laptops), or to ascertain the limitations of the browsers being used, the ability to identify and preload device-appropriate versions (or browser-specific versions) of content assets may prove highly effective in improving overall customer satisfaction. The eviction-related features of the predictive models may be of great benefit in scenarios where, for example, the utilization of resources available for caches at various application layers (such as edge servers or web servers) is typically high.

Illustrative Computer System

Figure 9:
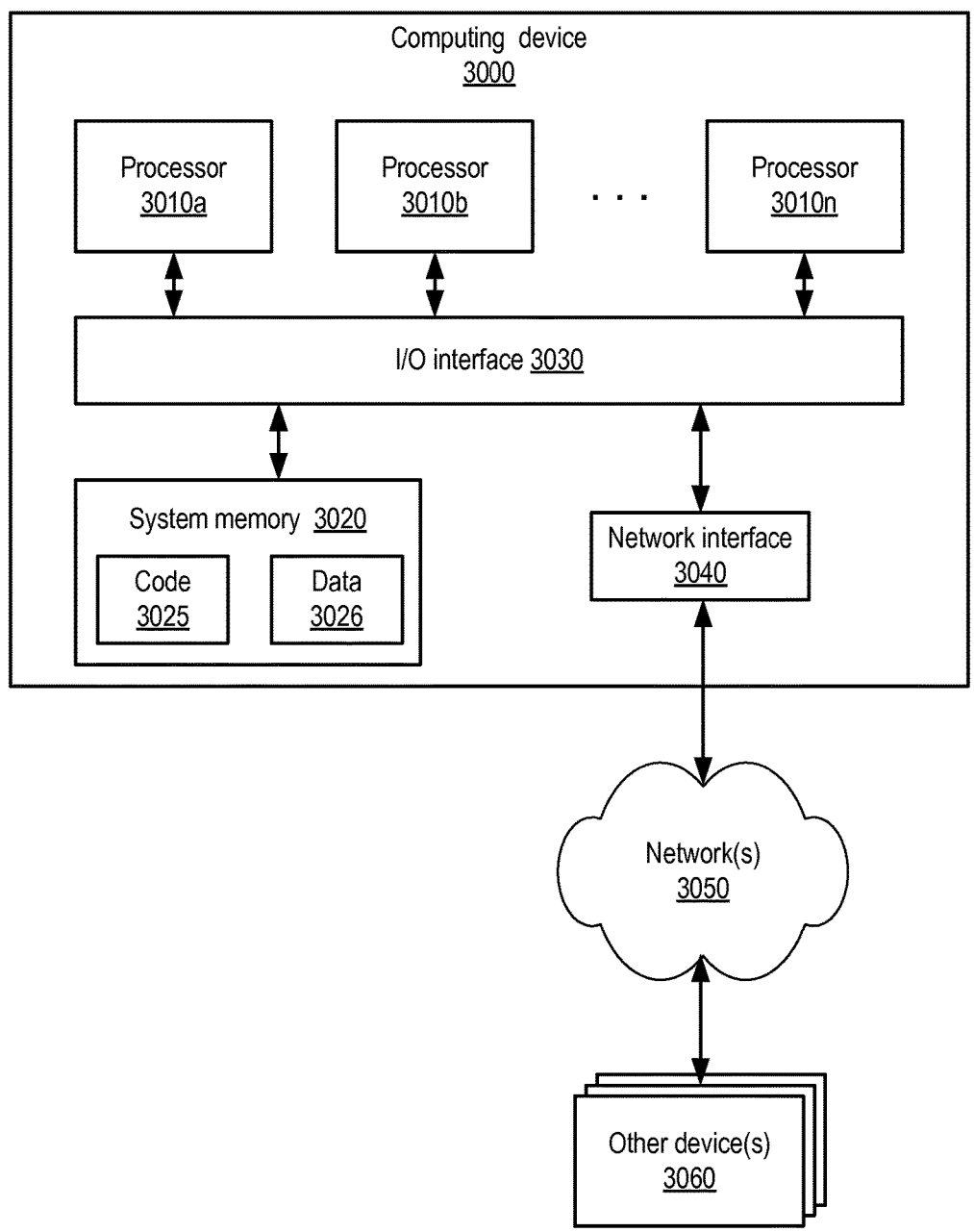
FIG. 9 is a block diagram illustrating an example computing device that may be used in some embodiments.

In at least some embodiments, a server that implements a portion or all of one or more of the technologies described herein, including the techniques to implement the functionality of the server-side and/or client-side preloaders and the predictive models used by the preloaders, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices comprising one or more respective hardware processors and memory and configured to:
   derive data from a history of received network content asset requests, wherein the history of received network content asset requests includes history from a plurality of distinct clients;
   generate, based at least in part on the derived data from the plurality of distinct clients, a model to predict a set of one or more additional network content assets anticipated to be requested by a client after the client has requested a given set of one or more network content assets;
   prior to application of the model to predict a particular set of one or more additional network content assets to be preloaded to one or more caches in anticipation of a request by a particular client,
      determine, based at least in part on a particular preload indicator asset comprising a script component of a particular set of network content assets requested by the particular client, whether to initiate an asset preload operation using the model, wherein the asset preload operation delivers one or more additional content assets to the one or more caches;
   for a determination to initiate the asset preload operation,
      predict, based at least in part on application of the model that was generated, the particular set of one or more additional network content assets to be preloaded to the one or more caches via the determined asset preload operation; and
      initiate a delivery of at least a portion of the predicted particular set to the one or more caches on behalf of the particular client.

2. The system as recited in claim 1, wherein the one or more computing devices are further configured to:
   modify the model based at least in part on an analysis of additional network content asset requests;
   predict, using the modified model and based at least in part on the same requested particular set of network content assets used to predict the particular set of one or more additional network content assets, a different set of one or more additional network content assets; and
   initiate a delivery of at least a portion of the predicted different set to the one or more caches on behalf of the particular client.

3. The system as recited in claim 1, wherein to generate the model, the one or more computing devices are configured to utilize contents of one or more HyperText Transfer Protocol (HTTP) header fields of the one or more received network content asset requests.

4. The system as recited in claim 1, wherein the model comprises one or more modifiable parameters, including one or more of: (a) an input history depth parameter indicating a number of received network asset requests to be used to determine the predicted set (b) an output prediction length parameter indicating a targeted size of the predicted set (c) a probability threshold indicating a minimum predicted request probability for an asset to initiate a preload operation for the asset or (d) one or more cost constraints to be used to determine whether to initiate a preload operation.

5. The system as recited in claim 1, wherein the one or more computing devices are configured to:
   determine one or more properties of one or more of (a) a browser being used by the particular client or (b) a computing device on which the browser is instantiated, including at least one performance property; and
   utilize at least one property of the one or more properties to select a particular version of at least one network content asset of the predicted set to be delivered to the one or more caches.

6. The system as recited in claim 1, wherein the one or more caches comprise at least one of: (a) a browser cache of the particular client or (b) a content cache at an edge server of a content delivery network.

7. A method, comprising:
   deriving data from a history of received network content asset requests, wherein the history of received network content asset requests includes history from a plurality of distinct clients;
   generating, based at least in part on the derived data from the plurality of distinct clients, a model to predict a set of one or more additional network content assets anticipated to be requested;
   determining, based at least in part on a particular preload indicator asset comprising a script component of a particular set of network content assets requested by a particular client, to perform an asset preload operation that delivers one or more additional content assets to one or more destinations associated with the particular client;
   subsequent to said determining to perform the asset preload operation,
      predicting, based at least in part on application of the model that was generated, a particular set of additional network content assets to be preloaded to the one or more destinations via the determined asset preload operation; and
   initiating delivery of at least a portion of the predicted particular set of additional network content assets to one or more destinations associated with the particular client.

8. The method as recited in claim 7, wherein the one or more destinations comprise a network browser of the particular client, further comprising:
    customizing, using the model, at least a portion of scripting code to be provided for execution at the network browser in response to a request from the particular client for the script component, such that execution at the network browser of the at least a portion of scripting code results in a transmission of the at least a portion of the predicted set of assets to the network browser.

9. The method as recited in claim 7, wherein the delivery of at least a portion of the predicted set of assets comprises delivery of at least one network content asset responsive to a request for a hidden inline frame (iframe) HyperText Markup Language (HTML) element.

10. The method as recited in claim 7, wherein the delivery of at least a portion of the predicted set of assets comprises delivery of at least one network content asset responsive to a request for an HTML element embedded within a network content asset to trigger the preload operation.

11. The method as recited in claim 7, wherein the delivery of at least a portion of the predicted set of assets comprises delivery of at least one network content asset as part of a delivery server-initiated push operation, without a corresponding browser-initiated request for the at least one network content asset.

12. The method as recited in claim 7, wherein said generating the model comprises using at least one of: (a) contents of an HTTP Referer header fields of a client network content asset request; (b) contents of a HTTP User-Agent field of a client network content asset request; or (c) a client Internet Protocol (IP) address.

13. The method as recited in claim 7, wherein the model comprises one or more modifiable parameters, including one or more of: (a) an input history depth parameter indicating a number of received network content asset requests to be used to determine the predicted set (b) an output prediction length parameter indicating a targeted size of the predicted set (c) a probability threshold indicating a minimum predicted request probability for an asset to initiate a preload operation for the asset or (d) one or more cost constraints to be used to determine whether to initiate a preload operation.

14. The method as recited in claim 13, further comprising:
    adjusting one or more of the modifiable parameters based at least in part on one or more metrics associated with asset preload operations.

15. The method as recited in claim 7, further comprising:
    determining one or more properties of one or more of (a) a network browser being used by the particular client or (b) a computing device on which the network browser is instantiated; and
    utilizing at least one property of the one or more properties to select a particular version of at least one network content asset of the predicted set to be delivered to the one or more destinations.

16. The method as recited in claim 7, wherein the at least a portion of a predicted set of assets includes at least one of: an image, a static HTML component, and a dynamic HTML component.

17. A non-transitory, computer-accessible storage medium storing program instructions that when executed on one or more processors:
    derive data from a history of received network content asset requests, wherein the history of received network content asset requests includes history from a plurality of distinct clients;
    generate, based at least in part on the derived data from the plurality of distinct clients, a model to predict a set of one or more additional network content assets anticipated to be requested by a client;
    determine, based at least in part on a particular preload indicator asset comprising a script component of a particular set of network content assets requested by a particular client, whether to perform an asset preload operation that delivers one or more additional content assets to one or more destinations associated with the particular client;
    subsequent to a determination to perform the asset preload operation,
        predict, based at least in part on application of the model that was generated, a particular set of one or more additional network content assets to be preloaded to the one or more destinations via the determined asset preload operation; and
    initiate delivery of at least a portion of the predicted particular set of one or more additional assets to the one or more destinations associated with the particular client.

18. The non-transitory, computer-accessible storage medium as recited in claim 17, wherein the one or more destinations comprise a network browser of the client and the particular preload indicator asset comprises a script component, wherein the instructions when executed on the one or more processors:
    customize, using the model, at least a portion of scripting code to be provided for execution at the network browser in response to a request from the client for the script component, such that execution at the network browser of the at least a portion of scripting code results in a transmission of the at least a portion of the predicted set of assets to a cache of the network browser.

19. The non-transitory, computer-accessible storage medium as recited in claim 17, wherein at least one asset of the particular set of network content assets requested by the particular client is accessible via a first website, and at least one asset of the predicted set of assets determined by the model for the particular set is accessible via a different website.

20. The non-transitory, computer-accessible storage medium as recited in claim 17, wherein the delivery of the at least a portion of a predicted set of assets comprises delivery to the client from a content source comprising one or more of: (a) a content cache at an edge server of a content delivery network (b) a content generating server configured to provide network content to be cached at one or more servers of a content delivery network or (c) a web server tier of a multi-tier application comprising an application server tier.

21. The non-transitory, computer-accessible storage medium as recited in claim 17, wherein the model determines a first predicted set anticipated to be requested by a first client after the first client has requested a given set of one or more network content assets, and a second predicted set anticipated to be requested by a second client after the second client has requested the given set of one or more network content assets.

22. The non-transitory, computer-accessible storage medium as recited in claim 17, wherein the model determines a first predicted set anticipated to be requested by a first client after the first client has requested a given set of one or more network content assets within a first time period, and a different predicted set anticipated to be requested by the first client after the first client has requested the given set of one or more network content assets within a second time period different from the first time period.

23. The non-transitory, computer-accessible storage medium as recited in claim 17, wherein the instructions when executed on the one or more processors:

analyze network content asset request records from a plurality of clients to determine the predicted set for the particular client, wherein the set of clients whose request records are to be analyzed to determine the predicted set for the particular client is determined at least in part on a customization setting of the model.

24. The non-transitory, computer-accessible storage medium as recited in claim 17, wherein the instructions when executed on the one or more processors:

determine one or more properties of one or more of (a) a network browser being used by the particular client or (b) a computing device on which the network browser is instantiated, including at least one performance property; and select a particular version of at least one network content asset of the predicted set to be delivered to the one or more destinations based at least one part on a property of the one or more properties.

25. The non-transitory, computer-accessible storage medium as recited in claim 24, wherein the particular version of the at least one network content asset comprises a summarized version of a network content asset.

26. The non-transitory, computer-accessible storage medium as recited in claim 17, wherein at least a portion of the model is incorporated within a network browser of the particular client.

27. The non-transitory, computer-accessible storage medium as recited in claim 17, wherein the one or more destinations comprise a cache, wherein the instructions when executed on the one or more processors:

determine, using the model, an asset to be evicted from the cache.

28. The non-transitory, computer-accessible storage medium as recited in claim 27, wherein the cache is a component of one of: (a) an edge server of a content delivery network or (b) a network browser of the particular client.

* * * * *